US012154511B2

(12) United States Patent
Pyun et al.

(10) Patent No.: US 12,154,511 B2
(45) **Date of Patent: *Nov. 26, 2024**

(54) DISPLAY DEVICE HAVING SCAN SIGNALS WITH ADJUSTABLE PULSE WIDTHS

(71) Applicant: SAMSUNG DISPLAY CO., LTD., Yongin-si (KR)

(72) Inventors: Ki Hyun Pyun, Yongin-si (KR); Jang Hoon Kwak, Yongin-si (KR); Won Jin Seo, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/050,286

(22) Filed: Oct. 27, 2022

(65) Prior Publication Data

US 2023/0084383 A1 Mar. 16, 2023

Related U.S. Application Data

(63) Continuation of application No. 17/318,289, filed on May 12, 2021, now Pat. No. 11,514,860.

(30) Foreign Application Priority Data

Sep. 16, 2020 (KR) ........................ 10-2020-0119405

(51) Int. Cl.
*G09G 3/3266* (2016.01)

(52) U.S. Cl.
CPC ... *G09G 3/3266* (2013.01); *G09G 2310/0248* (2013.01); *G09G 2310/08* (2013.01)

(58) Field of Classification Search
CPC ......... G09G 3/3266; G09G 2310/0248; G09G 2310/08; G09G 2300/0426;
(Continued)

(56) References Cited

U.S. PATENT DOCUMENTS 9,626,912 B2 4/2017 Kim et al.
9,633,595 B2 4/2017 Hwang et al.
(Continued)

FOREIGN PATENT DOCUMENTS

EP 3561801 10/2019
KR 1020160087484 7/2016
(Continued)

OTHER PUBLICATIONS

Notice Of Allowance dated Jul. 21, 2022 in corresponding U.S. Appl. No. 17/318,289.
(Continued)

*Primary Examiner* — Muhammad N Edun

(74) *Attorney, Agent, or Firm* — F. Chau & Associates, LLC

(57) ABSTRACT

A display device includes a display panel including scan lines, first signal lines connected to the scan lines in a first pixel block, second signal lines connected to the scan lines in a second pixel block, third signal lines connected to the scan lines in a third pixel block; a first scan driver supplying a first output signal to the first signal lines based on a first sub-clock signal; a second scan driver supplying a second output signal to the second signal lines based on a second sub-clock signal; a third scan driver supplying a third output signal to the third signal lines based on and a third sub-clock signal; and a timing controller. Changes in pulse widths of the first to third output signals are different in one frame period.

15 Claims, 16 Drawing Sheets

(58) Field of Classification Search
CPC ... G09G 2310/0218; G09G 2310/0221; G09G 3/20; G09G 2310/0267; G09G 2310/021; G09G 2320/02
See application file for complete search history.

(56) References Cited

U.S. PATENT DOCUMENTS

| | | | |
|---|---|---|---|
| 10,096,285 | B2 | 10/2018 | Kim |
| 10,332,438 | B2 | 6/2019 | Woo et al. |
| 10,417,970 | B2 | 9/2019 | Son et al. |
| 2011/0273408 | A1 | 11/2011 | Ra et al. |
| 2016/0217729 | A1 | 7/2016 | Kim et al. |
| 2017/0352328 | A1 | 12/2017 | Jeong et al. |
| 2017/0358258 | A1 | 12/2017 | Kim et al. |
| 2018/0158393 | A1 | 6/2018 | Woo et al. |
| 2019/0392773 | A1 | 12/2019 | Higuchi et al. |
| 2020/0098311 | A1 | 3/2020 | Hsu et al. |
| 2021/0201808 | A1 | 7/2021 | Yu et al. |
| 2022/0084469 | A1 | 3/2022 | Pyun et al. |

FOREIGN PATENT DOCUMENTS

| | | |
|---|---|---|
| KR | 1020160093153 | 8/2016 |
| KR | 10-2017-0019021 | 2/2017 |
| KR | 10-2017-0021432 | 2/2017 |
| KR | 10-2018-0066330 | 6/2018 |

OTHER PUBLICATIONS

Office Action dated Mar. 23, 2022 in corresponding U.S. Appl. No. 17/318,289.

DISPLAY DEVICE HAVING SCAN SIGNALS WITH ADJUSTABLE PULSE WIDTHS

CROSS-REFERENCE TO RELATED APPLICATION

This U.S. non-provisional patent application is a continuation of U.S. patent application Ser. No. 17/318,289 filed May 12, 2021, which claims priority under 35 U.S.C. § 119(a) to Korean Patent Application No. 10-2020-0119405 filed in the Korean Intellectual Property Office on Sep. 16, 2020, the disclosures of which are incorporated by reference in their entirety.

TECHNICAL FIELD

The present disclosure relates to an electronic device, and more particularly, to a display device.

DISCUSSION OF RELATED ART

A flat panel display (FPD) is an electronic viewing technology used to enable people to see content (e.g., still or moving images). An FPD is lighter, thinner, and uses less power than a traditional cathode ray tube (CRT) display, An FPD typically includes a display panel having a plurality of pixels, a data driver to provide data voltages, and a scan driver to provide scan signals to rows of the pixels that determine whether a given one of the pixels will receive one of the data voltages. As an example, the scan driver is disposed at one side of the display panel and the data driver is disposed at another side of the display panel. A bezel of an FPD may refer to a non-display area surrounding the display panel. A narrow bezel may be realized when non-display areas at both sides of the display panel are minimized. A narrow bezel may be implemented when the scan driver and the data driver are disposed together in a single side driving structure at one side of the display panel.

In such a display device having a single side driving type, RC load non-uniformity occur at pixels of the display panel, and timings, at which a scan signal and a data signal are supplied to each of the pixels, are not synchronized, thereby resulting in a data charging ratio deviation, which may degrade display quality.

SUMMARY OF THE INVENTION

At least one embodiment of the present disclosure provides a display device, which adaptively outputs output signals for supplying scan signals to the same scan line based on pixel blocks.

A display device according to an embodiment of the disclosure includes a display panel, a first scan driver, a second scan driver, a third scan driver, and a timing controller. The display panel includes a first pixel block, a second pixel block, and a third pixel block where each pixel block includes pixels. The display panel further includes scan lines connected to the pixels, first signal lines connected to the scan lines in the first pixel block, second signal lines connected to the scan lines in the second pixel block, and third signal lines connected to the scan lines. The first scan driver supplies a first output signal as a scan signal to the first signal lines based on a first sub-clock signal. The second scan driver supplies a second output signal as the scan signal to the second signal lines based on a second sub-clock signal. The third scan driver supplies a third output signal as the scan signal to the third signal lines based on a third sub-clock signal. The timing controller generates the first sub-clock signal, the second sub-clock signal, and the third sub-clock signal. A change in pulse width of the first output signal, a change in pulse width of the second output signal, and a change in pulse width of the third output signal are different in one frame period.

According to an embodiment, the first to third pixel blocks are consecutively disposed in a first direction, the scan lines extend in the first direction, and the first signal lines, the second signal lines, and the third signal lines extend in a second direction intersecting the first direction.

According to an embodiment, the first output signal, the second output signal, and the third output signal include a pre-charge period and a main-charge period.

According to an embodiment, lengths of the first signal lines, the second signal lines, and the third signal lines gradually increase toward the first direction in the display panel.

According to an embodiment, the display panel is divided into a first area and a second area closer to the scan driver than the first area, and two or more different scan lines among the scan lines are disposed in the first area and the second area, respectively.

According to an embodiment, the pulse width of the first output signal, the pulse width of the second output signal, and the pulse width of the third output signal are increased at different rates during the one frame period.

According to an embodiment, a first left signal line, a first center signal line, and a first right signal line may be connected to a first scan line disposed in the first area. A pulse width of a first left output signal supplied to the first left signal line may be less than a pulse width of a first center output signal supplied to the first center signal line. The pulse width of the first center output signal may be less than a pulse width of a first right output signal supplied to the first right signal line According to an embodiment, the first left output signal, the first center output signal, and the first right output signal are simultaneously changed to a gate-on level in synchronization with a main clock signal provided by the timing controller.

According to an embodiment, supply time points of the first to third sub-clock signals corresponding to the scan signal output to the first scan line are different from one another.

According to an embodiment, a second left signal line, a second center signal line, and a second right signal line are connected to a second scan line disposed in the second area of the display panel. A pulse width of a second left output signal supplied to the second left signal line may be greater than a pulse width of a second center output signal supplied to the second center signal line, and the pulse width of the second center output signal may be greater than a pulse width of a second right output signal supplied to the second right signal line.

According to an embodiment, supply time points of the first to third sub-clock signals corresponding to the scan signal output to the second scan line are different from one another.

According to an embodiment, a difference between the pulse width of the first left output signal and the pulse width of the second left output signal is greater than a difference between the pulse width of the first center output signal and the pulse width of the second center output signal.

According to an embodiment, the difference between the pulse width of the first center output signal and the pulse width of the second center output signal is greater than a difference between a pulse width of the first right output signal and a pulse width of the second right output signal.

According to an embodiment, the main-charge period includes a first period for maintaining a gate-on level and a second period for applying kickback compensation from the gate-on level.

According to an embodiment, the second period of the first left output signal is less than the second period of the first center output signal, and the second period of the first center output signal is less than the second period of the first right output signal.

According to an embodiment, the second period of the second left output signal is greater than the second period of the second center output signal, and the second period of the second center output signal is greater than the second period of the second right output signal.

According to an embodiment, the first to third scan drivers determine the second period based on pulse widths of the first to third sub-clock signals.

According to an embodiment, the timing controller gradually increases the pulse width of the first sub-clock signal and gradually decreases the pulse width of the third sub-clock signal during the one frame period.

According to an embodiment, the display device further includes a data driver disposed at the same side as the first to third scan drivers from the display panel and supplies data signals to data lines connected to the pixels.

A display device according to embodiment of the disclosure includes a display panel, a first scan driver, a second scan driver, a third scan driver, and a timing controller. The display panel includes a first pixel block, a second pixel block, and a third pixel block each including pixels and further includes scan lines connected to the pixels, left signal lines connected to the scan lines in the first pixel block, center signal lines connected to the scan lines in the second pixel block, and right signal lines connected to the scan lines. The first scan driver supplies a left output signal as a scan signal to the left signal lines based on a first sub-clock signal. The second scan driver supplies a center output signal as the scan signal to the center signal lines based on a second sub-clock signal. The third scan driver supplies a right output signal as the scan signal to the right signal lines based on a third sub-clock signal. The timing controller generates the first sub-clock signal, the second sub-clock signal, and the third sub-clock signal. When a first left output signal, a first center output signal, and a first right output signal are supplied to a first scan line disposed in a first area of the display panel, the timing controller sequentially outputs the first sub-clock signal, the second sub-clock signal, and the third sub-clock signal. When a second left output signal, a second center output signal, and a second right output signal are supplied to a second scan line disposed in a second area of the display panel, the timing controller sequentially outputs the third sub-clock signal, the second sub-clock signal, and the first sub-clock signal, and the second area is closer to the scan driver than the first area.

A display device according to embodiment of the disclosure includes a display panel and a scan driver. The display panel includes a plurality of pixels and scan lines connected to the pixels. The scan driver is configured to simultaneously provide at a first time, a first left output signal to a first left node of a first scan line among the scan lines, a first center output signal to a first center node of the first scan line, and a first right output signal to a first right node of the first scan line, wherein pulse widths of the first output signals differ from one another. The scan driver is configured to simultaneously provide at a second time, a second left output signal to a second left node of a second scan line among the scan lines, a second center output signal to a second center node of the second scan line, and a second right output signal to a second right node of the second scan line, wherein pulse widths of the second output signals differ from one another.

In an embodiment, the pulse width of the first center output signal is greater than the pulse width of the first left output signal and less than the pulse width of the first right output signal, and the pulse width of the second center output signal is less than the pulse width of the second left output signal and greater than the pulse width of the second right output signal.

In an embodiment, the display device further includes a timing controller providing first, second, and third clock signals for setting the pulse widths of the output signals.

DETAILED DESCRIPTION

Hereinafter, embodiments of the present disclosure will be described in more detail with reference to the accompanying drawings. Like numbers refer to like elements throughout the description of the figures, and the description of the same component will not be reiterated.

Figure 1:
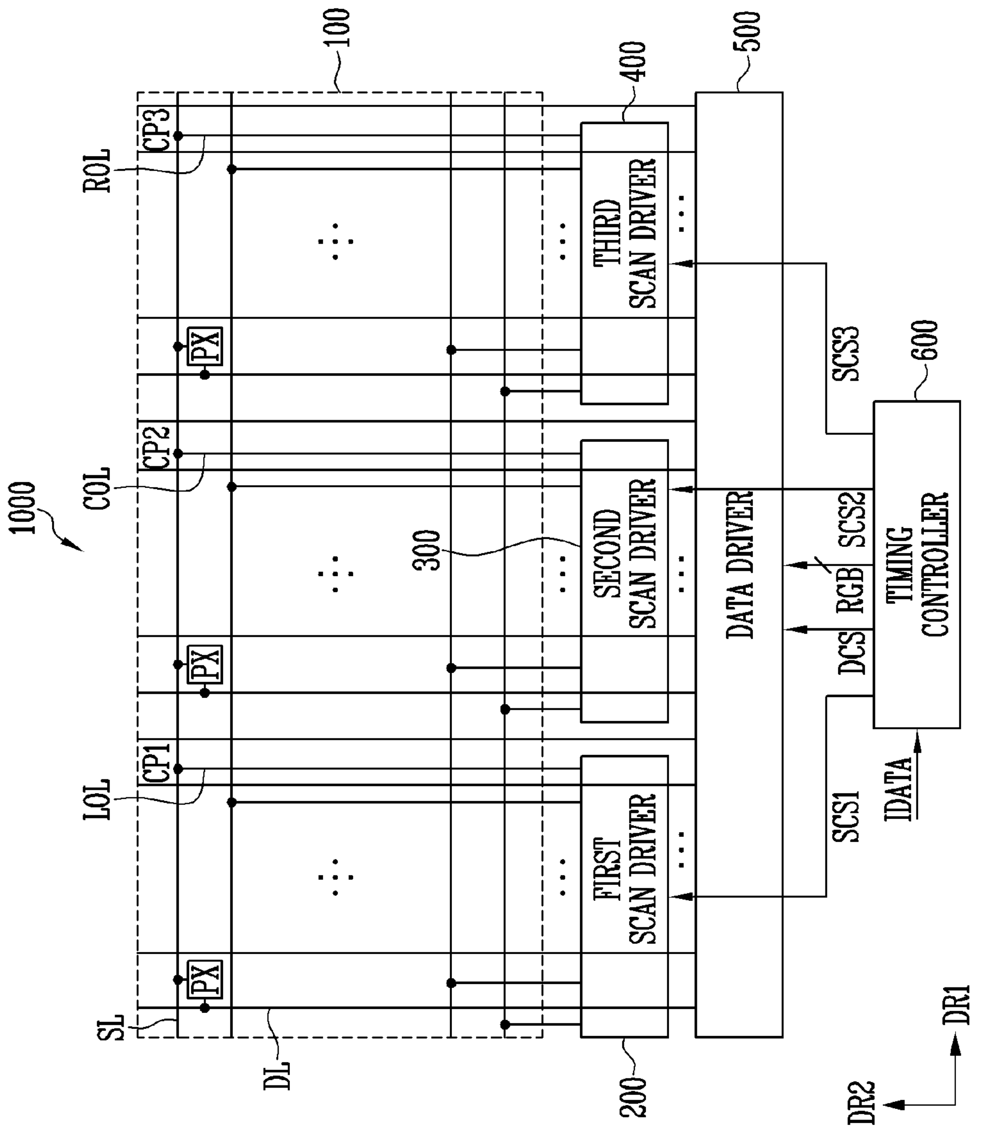
FIG. 1 is a block diagram illustrating a display device according to an embodiment of the disclosure.

FIG. 1 is a block diagram illustrating a display device according to an embodiment of the present disclosure.

Referring to FIG. 1, a display device 1000 includes a display panel 100, a first scan driver 200, a second scan driver 300, a third scan driver 400, a data driver 500, and a timing controller 600 (e.g., a control circuit). In an embodiment, one or more of the above-described drivers is implemented by a driving circuit. The display panel 100 may include a plurality of pixels PX.

The display device 1000 may be implemented as a self-luminous display device including a plurality of self-luminous elements. For example, the display device 1000 may be an organic light-emitting display device including organic light-emitting elements or a display device including inorganic light-emitting elements. However, this is merely an example, and the display device 1000 may be implemented as a liquid crystal display device, a plasma display device, or a quantum dot display device.

The display device 1000 may be a flat display device, a flexible display device, a curved display device, a foldable display device, or a bendable display device. In addition, the display device may be applied to a transparent display device, a head-mounted display device, or a wearable display device.

The display panel 100 may include a plurality of pixels PX connected to scan lines SL and data lines DL. The display device 1000 according to a present embodiment is the display device 1000 having a single side driving structure in which the data driver 500 and the scan drivers 200, 300, and 400 are disposed together at one side of the display panel 100. In an embodiment, each of the scan lines SL is connected to a first signal line LOL (hereinafter, may be referred to as a left signal line), a second signal line COL (hereinafter, may be referred to as a center signal line), and a third signal line ROL (hereinafter, may be referred to as a right signal line) at predetermined contacts CP1, CP2, and CP3.

The display panel 100 may be divided into a first pixel block (e.g., a first group of pixels), a second pixel block (e.g., a second group of pixels), and a third pixel block (e.g., a third group of pixels) based on areas in which the left signal line LOL, the center signal line COL, and the right signal line ROL are disposed. In FIG. 1, the scan line SL is illustrated as being connected to three signal lines LOL, COL, and ROL, but the present invention is not limited thereto.

The scan line SL may extend in a first direction DR1 (for example, a pixel row direction or a horizontal direction) and may be connected to the pixels PX in a corresponding pixel row. A scan signal may be supplied to the pixels PX through the scan line SL. That is, each of the scan lines SL may define a pixel row.

The left signal line LOL may extend in a second direction DR2 and may be connected to the scan line SL at a first contact CP1. The left signal line LOL may electrically connect the first scan driver 200 and the scan line SL. For example, the second direction DR2 may correspond to a pixel column direction. In an embodiment, the first direction DR1 is perpendicular to the second direction DR2, but embodiments of the disclosure are not limited thereto.

When a single signal line is connected to the scan line SL, an RC load deviation (RC delay) between a portion close to a contact (for example, CP1) and a portion far away from the contact (for example, CP1) may be increased. In an embodiment, the scan line SL is connected to a plurality of signal lines LOL, COL, and ROL spaced apart from each other to reduce the RC load deviation.

The center signal line COL may extend in the second direction DR2 and may be connected to the scan line SL at a second contact CP2. The center signal line COL may electrically connect the second scan driver 300 and the scan line SL.

The right signal line ROL may extend in the second direction DR2 and may be connected to the scan line SL at a third contact CP3. The right signal line ROL may electrically connect the third scan driver 400 and the scan line SL.

In an embodiment, the left signal lines LOL are connected to the scan lines SL, respectively, and the center signal lines COL are also connected to the scan lines SL, respectively. The right signal lines ROL may also be connected to the scan lines SL, respectively. In an embodiment, the left signal lines LOL, the center signal lines COL, and the right signal lines ROL are arranged such that lengths thereof are gradually increased toward the first direction DR1.

The data lines DL may be connected to the pixels PX in a pixel column unit. For example, each of the data lines DL may be connected to a corresponding column of the pixels PX.

The first scan driver 200 may receive a first control signal SCS1 from the timing controller 600. The first scan driver 200 supplies scan signals to the scan lines SL in response to the first control signal SCS1. For example, the first scan driver 200 may sequentially supply a first output signal (left output signal) for supplying scan signals to the scan lines SL to the left signal lines LOL. The first control signal SCS1 may include a scan start signal and clock signals for the first output signal (hereinafter, may be referred to as the left output signal).

The second scan driver 300 may receive a second control signal SCS2 from the timing controller 600. The second scan driver 300 supplies scan signals to the scan lines SL in response to the second control signal SCS2. For example, the second scan driver 300 may sequentially supply a second output signal (center output signal) for supplying scan signals to the scan lines SL to the center signal lines COL. The second control signal SCS2 may include a scan start signal and clock signals for the second output signal (hereinafter, may be referred to as the center output signal).

The third scan driver 400 may receive a third control signal SCS3 from the timing controller 600. The third scan driver 400 supplies scan signals to the scan lines SL in response to the third control signal SCS3. For example, the third scan driver 400 may sequentially supply a third output signal (right output signal) for supplying scan signals to the scan lines SL to the right signal lines ROL. The third control signal SCS3 may include a scan start signal and clock signals for the third output signal (hereinafter, may be referred to as the right output signal).

The first to third output signals (for example, the left output signal, the center output signal, and the right output signal) may be set to a gate-on level (low voltage or high voltage) corresponding to a type of transistor to which a scan signal is supplied. That is, the left output signal, the center output signal, and the right output signal may be generated and supplied as scan signals. In an embodiment, the left output signal, the center output signal, and the right output signal are substantially simultaneously or simultaneously supplied to the left signal line LOL, the center signal line COL, and the right signal line ROL, respectively for driving the scan line SL.

In an embodiment, pulse widths of the left output signal, the center output signal, and the right output signal output from the first to third scan drivers 200, 300 and 400 under control of the timing controller 600 may be changed into different forms according to charging ratio characteristics for each pixel block.

The data driver 500 may receive a fourth control signal DCS from the timing controller 600. The data driver 500 may convert image data RGB into analog data signals (data voltages) in response to the fourth control signal DCS and may supply the data signals to the data lines DL.

The timing controller 600 may receive input image data IDATA from an image source such as an external graphic device. The timing controller 600 may generate the image data RGB that satisfies an operating condition of the display panel 100 based on the input image data IDATA and may provide the generated image data RGB to the data driver 500.

The timing controller 600 may generate the first to fourth control signals SCS1, SCS2, SCS3, and DCS. In an embodiment, the first control signal SCS1 may include a scan start signal, a main clock signal, and a first sub-clock signal. The second control signal SCS2 may include a scan start signal, a main clock signal, and a second sub-clock signal. The third control signal SCS3 may include a scan start signal, a main clock signal, and a third sub-clock signal.

The main clock signal may determine a timing at which each of the output signals transitions to a gate-on level and a timing at which the output signals are shifted. The first sub-clock signal may determine a pulse width of the left output signal. The second sub-clock signal may determine a pulse width of the center output signal. The third sub-clock signal may determine a pulse width of the right output signal.

In an embodiment, the timing controller 600 independently adjusts the first sub-clock signal, the second sub-clock signal, and the third sub-clock signal. Accordingly, a change in the pulse width of the left output signal, a change in the pulse width of the center output signal, and a change in the pulse width of the right output signal may be different in one frame period. For example, a first difference between the pulse width of the left output signal applied to a first one of the scan lines and the pulse width of the left output signal applied to the first scan line may be different from a second difference between the pulse width of the center output signal applied to a the first scan line and the pulse width of the center output signal applied to the second scan line, and the first difference may be different from a third difference between the pulse width of the right output signal applied to the first scan line and the pulse width of the right output signal applied to the second scan line. For example, the second difference could be greater than the first difference and less than the third difference.

In an embodiment, as shown in FIG. 1, a display device is present that includes a display panel 100, a first scan driver 200, a second scan driver 300, a third scan driver 400, and a timing controller 600. The display panel 100 includes a first pixel block, a second pixel block, and a third pixel block, where each pixel block includes pixels. The panel 100 further includes scan lines connected to the pixels, first signal lines connected to the scan lines in the first pixel block, second signal lines connected to the scan lines in the second pixel block, and third signal lines connected to the scan lines in the third pixel block. The first scan driver is configured to supply a first output signal as a scan signal to the first signal lines based on a first sub-clock signal. The second scan driver is configured to supply a second output signal as the scan signal to the second signal lines based on a second sub-clock signal. The third scan driver is configured to supply a third output signal as the scan signal to the third signal lines based on a third sub-clock signal. The timing controller is configured to generate the first sub-clock signal, the second sub-clock signal, and the third sub-clock signal. A change in pulse width of the first output signal, a change in pulse width of the second output signal, and a change in pulse width of the third output signal are different in one frame period.

For example, the pulse widths of the output signals may be adjusted according to a relationship between a scan signal delay and a data signal delay at a corresponding position.

In an embodiment, the first scan driver 200, the second scan driver 300, and the third scan driver 400 are combined into a single scan driver controlled by the timing controller 600 using a single control signal. The signal scan driver provides all of the signals that are provided by the first scan driver 200, the second scan driver 300, and the third scan driver 400.

Figure 2A:
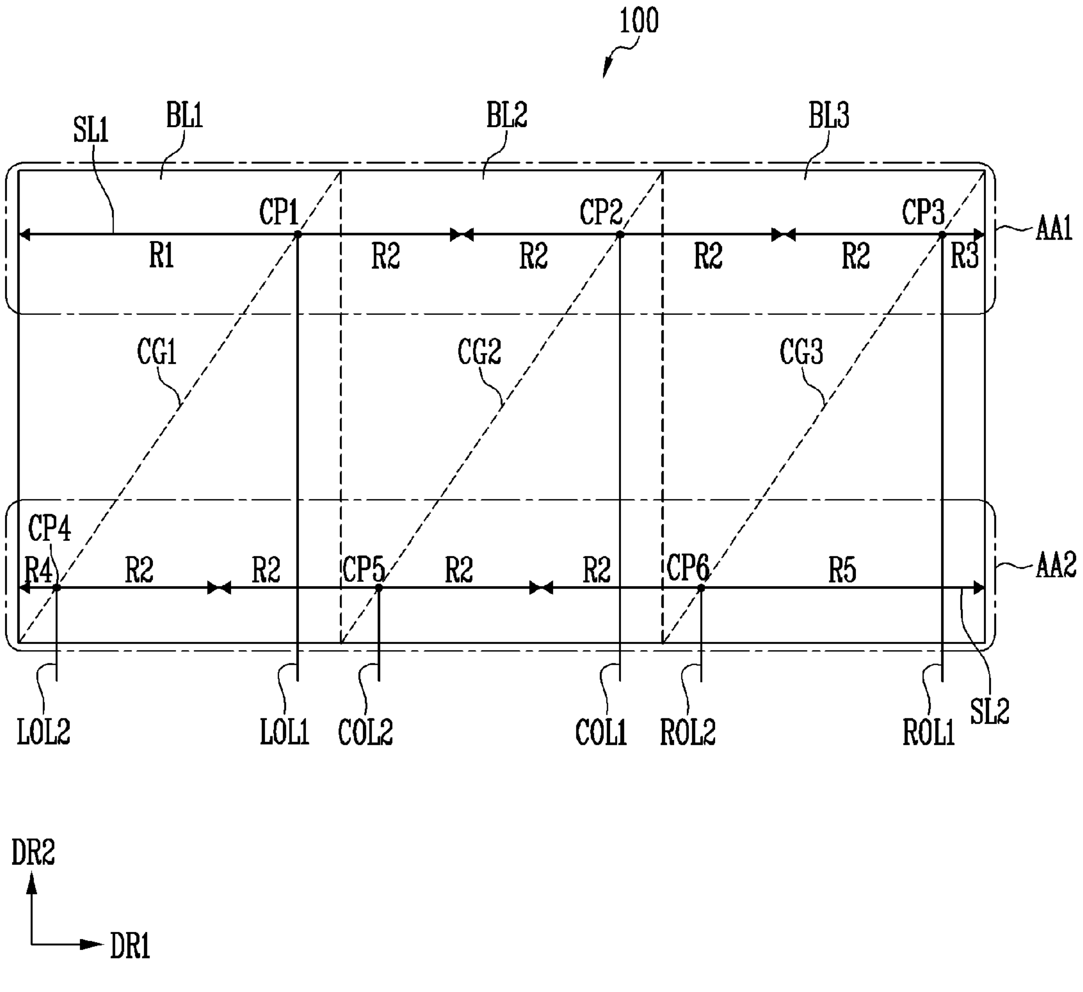
FIGS. 2A to 2C are diagrams for describing an example of a pixel unit included in the display device of FIG. 1.
Figure 2B:
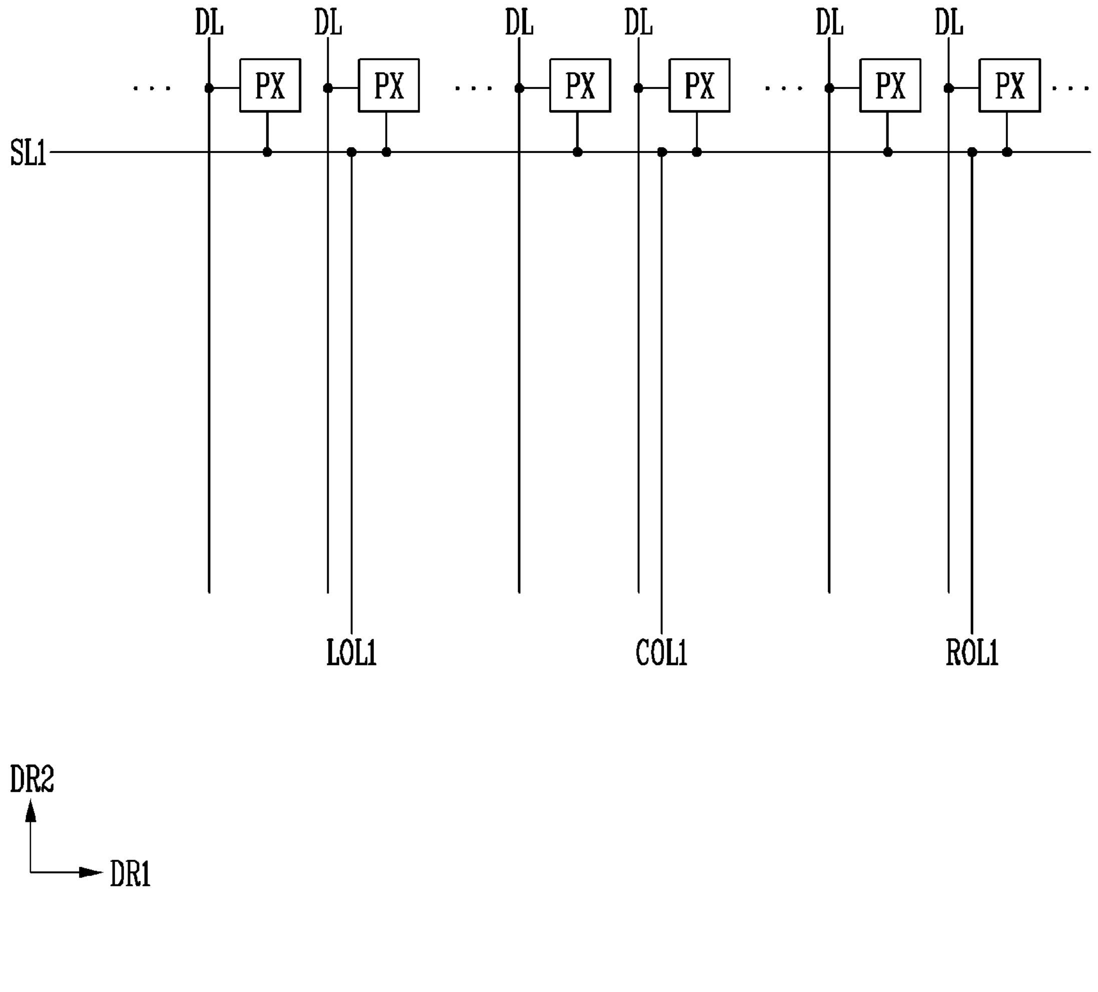
Figure 2C:
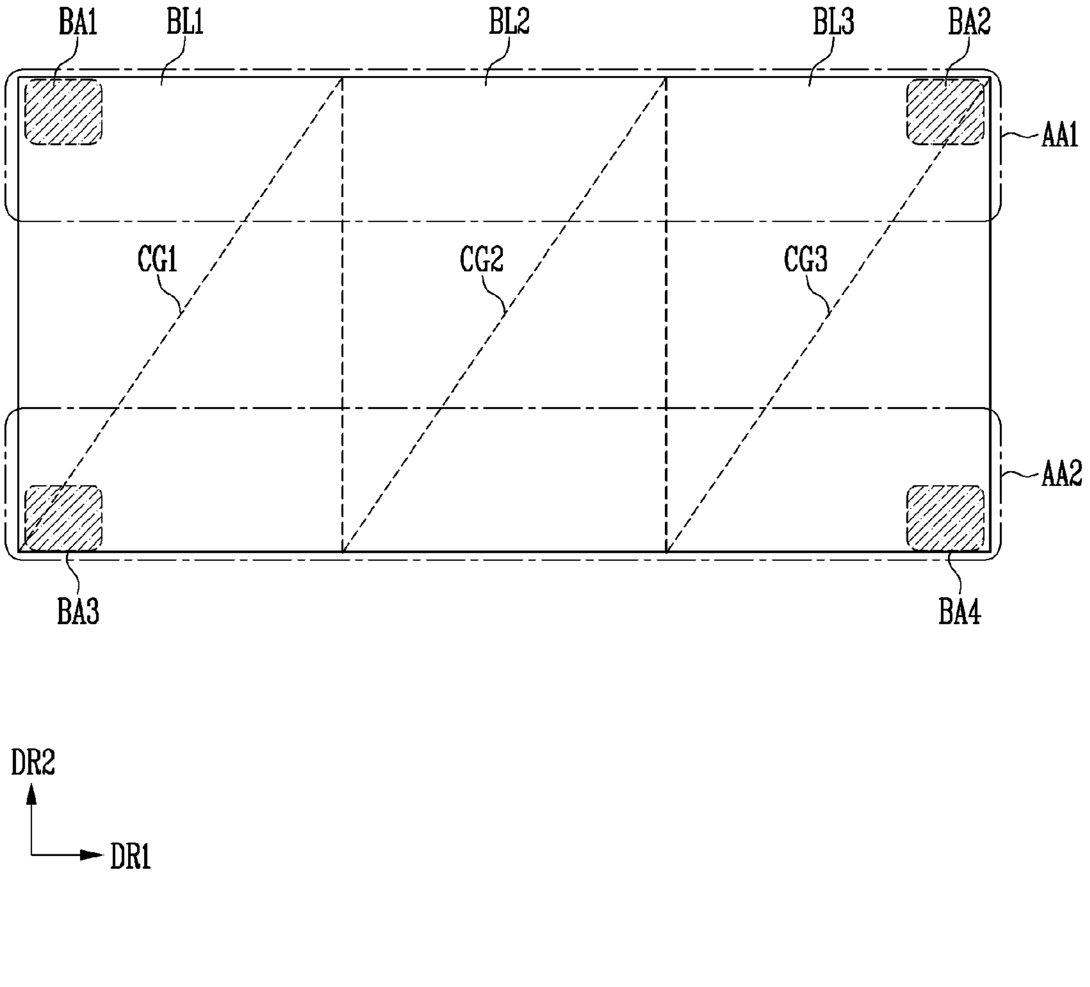
Figure 3:
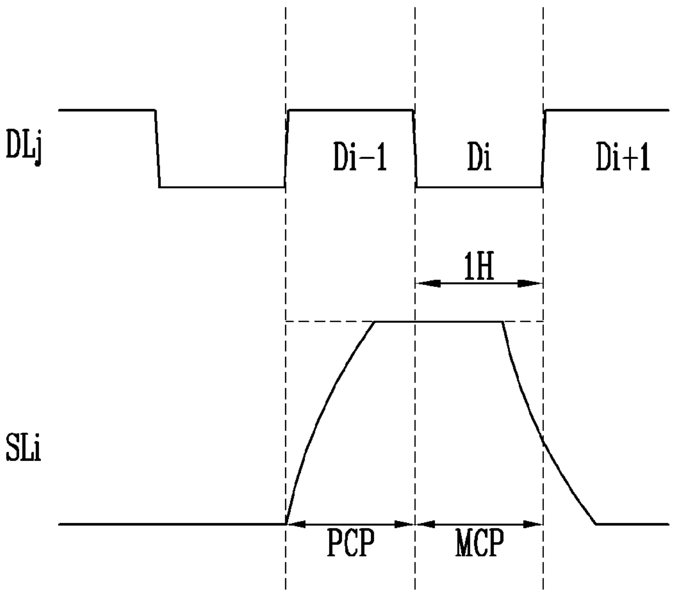
FIG. 3 is a timing diagram illustrating an example of signals supplied to a pixel included in the display device of FIG. 1.

FIGS. 2A to 2C are diagrams for describing an example of a display panel included in the display device of FIG. 1, and FIG. 3 is a timing diagram illustrating an example of signals supplied to a pixel included in the display device of FIG. 1.

Referring to FIGS. 1 to 3, a display panel 100 of a display device 1000 having a single side driving structure is divided into a plurality of pixel blocks BL1, BL2, and BL3 according to the arrangements of signal lines LOL1, LOL2, COL1, COL2, ROL1, ROL2 and contacts CP1 to CP6.

The left signal lines LOL1 and LOL2 extending from a first scan driver 200 are disposed in a first pixel block BL1. A first left signal line (or, a first-first signal line) LOL1 is connected to a first scan line SL1 through a first contact CP1. A second left signal line (or, a second-first signal line) LOL2 is connected to a second scan line SL2 through a fourth contact CP4.

FIG. 2A illustrates that the first scan line SL1 is disposed in a first area AA1 and the second scan line SL2 is disposed in a second area AA2. Here, the second area AA2 may be defined as an area relatively closer to scan drivers 200, 300, and 400 and a data driver 500 than the first area AA1. For example, the second scan line SL2 could be the last scan line that is closest to the scan drivers and the first scan line SL1 could be the first scan line that is farthest from the scan drivers.

In an embodiment, the left signal lines LOL1 and LOL2 are not in contact with each other or not electrically connected to one another. Accordingly, the contacts CP1 and CP4 of the first pixel block BL1 may be arranged in a shape similar to a diagonal shape with respect to the first direction DR1. For example, as illustrated in FIG. 2A, the arrangement of the contacts CP1 and CP4 of the first pixel block BL1 may form a first contact group CG1 in a diagonal shape with respect to the first direction DR1.

Similarly, the center signal lines COL1 and COL2 extending from a second scan driver 300 are disposed in a second pixel block BL2. A first center signal line (or, a first-second signal line) COL1 is connected to the first scan line SL1 through a second contact CP2. A second center signal line (or, a second-second signal line) COL2 is connected to the second scan line SL2 through a fifth contact CP5. The arrangement of the contacts CP2 and CP5 of the second pixel block BL2 may form a second contact group CG2 in a diagonal shape with respect to the first direction DR1.

The right signal lines ROL1 and ROL2 extending from a third scan driver 400 are disposed in a third pixel block BL3. A first right signal line (or, a first-third signal line) ROL1 is connected to the first scan line SL1 through a third contact CP3. A second right signal line (or, a second-third signal line) ROL2 is connected to the second scan line SL2 through a sixth contact CP6. The arrangement of the contacts CP3 and CP6 of the third pixel block BL3 may form a third contact group CG3 in a diagonal shape with respect to the first direction DR1.

Meanwhile, as illustrated in FIG. 2B, a plurality of pixels PXs are connected to the first scan line SL1 to define one pixel row. Scan signals supplied to the pixels PX through the first scan line SL1 may be supplied from the first left signal line LOL1, the first center signal line COL1, and the first right signal line ROL1.

In an embodiment, the scan signals are supplied substantially simultaneously or simultaneously from the first left signal line LOL1, the first center signal line COL1, and the right signal line ROL1 to the pixels connected to the first scan line SL1 to reduce an RC delay deviation of the scan signals supplied to the pixels PX connected to the first scan line SL1. Other scan lines and pixel rows may have a configuration similar to that illustrated in FIG. 2B.

As a length of a line is increased, an RC delay of an output signal may be increased. For example, equivalent resistance (or equivalent impedance) of the first left signal line LOL1 includes a first resistance component (or, equivalent resistance) R1 at a left side of the first contact CP1 and a second resistance component R2 at a right side of the first contact CP1. Since a portion of the first scan line SL1 between the first contact CP1 and the second contact CP2 is affected by both a left output signal and a center output signal, a resistance component (RC delay) of an intermediate portion between the first contact CP1 and the second contact CP2 may be considered to be the greatest between the first contact CP1 and the second contact CP2.

Similarly, equivalent resistance of the first center signal line COL1 includes a second resistance component R2 at each of both sides of the second contact CP2. Equivalent resistance of the first right signal line ROL1 includes a second resistance component R2 at a left side of the third contact CP3 and a third resistance component R3 at a right side of the third contact CP3.

Here, according to a length of a corresponding portion of the scan line, the first resistance component R1 may be the greatest, and the third resistance component R3 may be the smallest.

Accordingly, in the first scan line SL1 included in the first area AA1, an RC delay of a scan signal may be the greatest in the first pixel block BL1 in which the first left signal line LOL1 has the greatest influence. An RC delay of a scan signal may be the smallest in the third pixel block BL3 in which the first right signal line ROL1 has the smallest influence. That is, the RC delay may be gradually decreased from the first pixel block BL1 to the third pixel block BL3.

For example, an RC delay of a left output signal supplied to the first left signal line LOL1 is greater than an RC delay of a center output signal supplied to the first center signal line COL1 and greater than an RC delay of a right output signal supplied to the first right signal line ROL1. Further, the RC delay of the center output signal supplied to the first center signal line COL1 may be greater than the RC delay of the right output signal supplied to the first right signal line ROL1.

Such a trend may be maintained until the first resistance component R1 is decreased to the second resistance component R2 or less.

In an embodiment, the second area AA2 has an RC delay trend opposite to that of the first area AA1. Accordingly, in the second scan line SL2 included in the second area AA2, an RC delay of a scan signal in the first pixel block BL1 may be the smallest and an RC delay of a scan signal in the third pixel block BL3 may be the greatest. That is, the RC delay may be gradually increased from the first pixel block BL1 to the third pixel block BL3.

For example, an RC delay of a left output signal supplied to the second left signal line LOL2 is less than an RC delay of a center output signal supplied to the second center signal line COL2 and less than an RC delay of a right output signal supplied to the second right signal line ROL2. Further, the RC delay of the center output signal supplied to the second center signal line COL2 may be less than the RC delay of the right output signal supplied to the second right signal line ROL2.

Meanwhile, an RC delay of a data signal supplied through the data lines DL may be increased as a distance from the data driver 500 is increased. Accordingly, an RC delay of data signals supplied to the pixels PX of the first area AA1 may be greater than an RC delay of data signals supplied to the pixels PX of the second area AA2.

FIG. 2C illustrates portions BA1 to BA4 in which image defects are exhibited due to a delay of a scan signal and a delay deviation of a data signal. When a display device is driven as illustrated in the timing diagram of FIG. 3, a scan signal is supplied to an $i^{th}$ scan line SLi during two horizontal periods (twice one horizontal period 1H), wherein i is an integer greater than 1. For example, in a high-resolution display device driven at a high speed of 120 Hz or more, a scan signal may be supplied during two horizontal periods to secure a charging time of a data signal. For example, the scan signal is activated for part of each of the two horizontal periods.

The scan signal may include a pre-charge period PCP and a main-charge period MCP. During the pre-charge period PCP, an $i-1^{th}$ data signal Di−1 corresponding to an $i-1^{th}$ pixel row is supplied to the $j^{th}$ data line DLj, and during the main-charge period MCP, an $i^{th}$ data signal Di corresponding to the $i^{th}$ pixel row is supplied, wherein j is a natural number. A pixel (hereinafter, referred to as corresponding pixel) corresponding to the $i^{th}$ scan line SLi and the $j^{th}$ data line DLj may emit light based on the supplied $i^{th}$ data signal Di.

Meanwhile, a slew rate of a scan signal may change due to an RC delay. For example, a transition time of the scan signal may increase due to the RC delay in the $i^{th}$ scan line SLi. When a rising time of the scan signal is increased, a supply time of the $i^{th}$ data signal Di may decrease so that a data charging ratio of a pixel may decrease. In addition, when a falling time of the scan signal is increased, noise of a data signal supplied to a corresponding pixel by an $i+1^{th}$ data signal Di+1 may be generated. The decrease in charging ratio and the noise may cause image defects.

In FIG. 2C, data signal noise may be the worst because a delay of a scan signal is the greatest at a first portion BA1 and a fourth portion BA4. Accordingly, data signal noise may be compensated for (or reduced) by decreasing a falling time (or pulse width) of the scan signal at the first portion BA1 and the fourth portion BA4.

Meanwhile, a delay of a scan signal is the smallest at a second portion BA2 in the first area AA1, and a delay of a scan signal is the smallest at a third portion BA3 in the second area AA2. In the second portion BA2, since a delay of a data signal is the greatest, a charging ratio of the data signal may be the lowest. In addition, since a falling time of a scan signal is short at the second portion BA2 and the third portion BA3, a kickback in which a voltage level of the data signal is decreased may be significant. A width (or, a pulse width) of a scan signal may be relatively increased, or a time during which the scan signal falls may be relatively increased as compared with other portions to compensate for such a decrease in charging ratio and kickback (for example, referred to as kickback slice or kickback compensation).

A method of compensating for data signal noise, a charging ratio, and a charging defect of a data signal due to kickback in the display device 1000 having such a single side driving structure will be described in detail below with reference to FIG. 5A.

Figure 4:
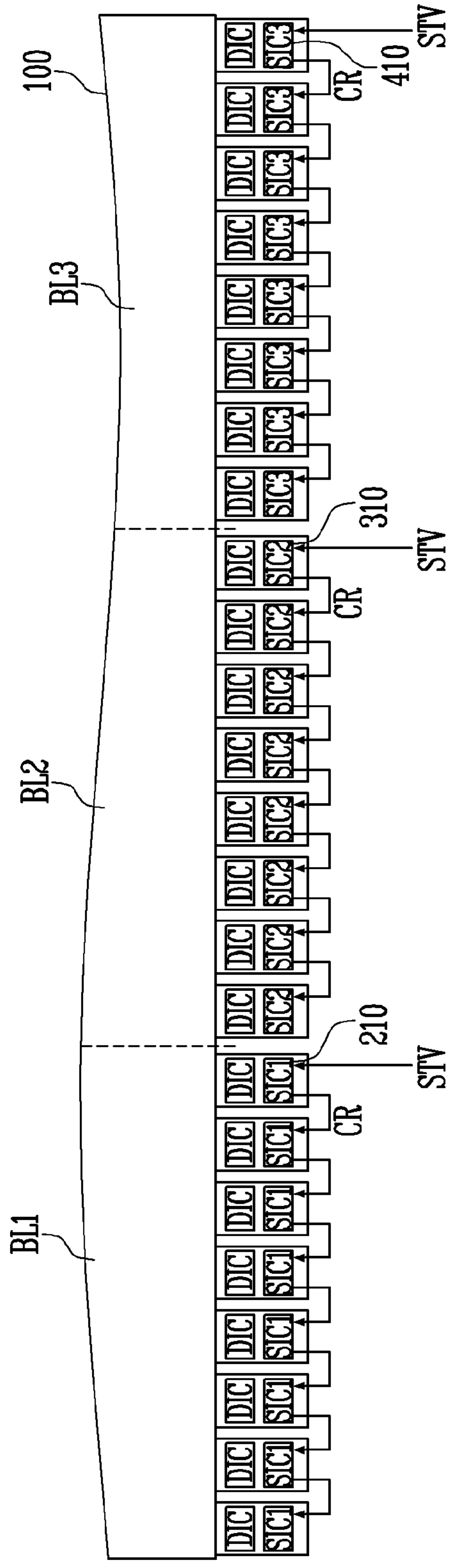
FIG. 4 is a diagram illustrating an example of a scan driver and a data driver included in the display device of FIG. 1.

FIG. 4 is a diagram illustrating an example of a scan driver and a data driver included in the display device of FIG. 1.

Referring to FIGS. 1, 2A, and 4, scan driving circuits SIC1, SIC2, and SIC3 constituting scan drivers 200, 300, and 400 and data driving circuits DIC constituting a data driver 500 may be disposed at one side of a display panel 100.

In an embodiment, the scan driving circuits SIC1, SIC2, and SIC3 and the data driving circuits DIC are disposed in the form of a chip-on film (COF) on a flexible film.

The left scan driving circuits SIC1 corresponding to a first pixel block BL1 constitute a first scan driver 200 and may be connected to left signal lines LOL.

A scan start signal STV may be supplied to a first left scan driving circuit 210. The left scan driving circuits SIC1 may transmit carry signals CR in a direction opposite to a first direction DR1 and may sequentially output left output signals to the left signal lines LOL.

The center scan driving circuits SIC2 corresponding to a second pixel block BL2 constitute a second scan driver 300 and may be connected to center signal lines COL.

A scan start signal STV may be supplied to a first center scan driving circuit 310. The center scan driving circuits SIC2 may transmit carry signals CR in the direction opposite to the first direction DR1 and may sequentially output center output signals to the center signal lines COL.

The right scan driving circuits SIC3 corresponding to a third pixel block BL3 constitute a third scan driver 400 and may be connected to right signal lines ROL.

A scan start signal STV may be supplied to a first right scan driving circuit 410. The right scan driving circuits SIC3 may transmit carry signals CR in the direction opposite to the first direction DR1 and may sequentially output right output signals to the right signal lines ROL.

Figure 5A:
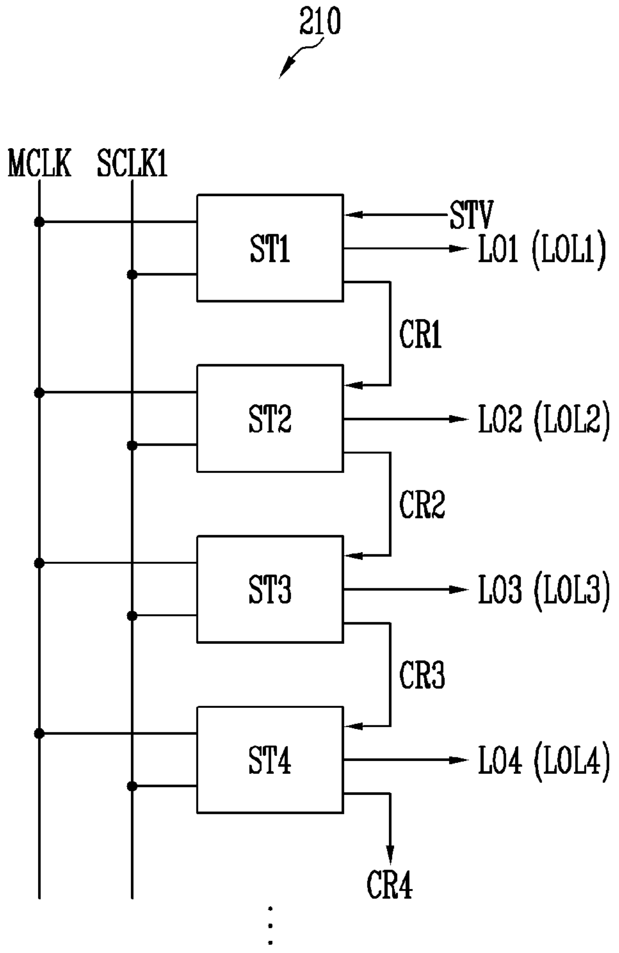
FIG. 5A is a block diagram illustrating an example of a first scan driver of FIG. 4.

FIG. 5A is a block diagram illustrating an example of the first scan driver of FIG. 4.

Referring to FIGS. 1, 4, and 5A, a first left scan driving circuit 210 included in a first scan driver 200 includes a plurality of stages ST1, ST2, ST3, ST4, . . . connected in a cascade structure.

The remaining scan driving circuits SIC1 included in the first scan driver 200 may also have a configuration substantially the same as or similar to the configuration illustrated in FIG. 5A. In an embodiment, a last carry signal of the first left scan driving circuit 210 is supplied to a first stage of an adjacent left scan driving circuit.

The stages ST1, ST2, ST3, ST4, . . . may sequentially output left output signals LO1, LO2, LO3, LO4, . . . and carry signals CR1, CR2, CR3, CR4, . . . based on a scan start signal STV and a main clock signal MCLK. For example, first to fourth left output signals LO1, LO2, LO3, and LO4 may be sequentially supplied to first to fourth left signal lines LOL1, LOL2, LOL3, and LOL4, respectively. Each of the first to fourth left output signals LO1, LO2, LO3, and LO4 may be supplied to scan lines as a scan signal.

The first carry signal CR1 may be supplied to an input of a second stage ST2, and a second carry signal CR2 may be supplied to an input of a third stage ST3. That is, the $k^{th}$ carry signal may be supplied to an input of the $k+1^{th}$ stage, wherein k is a natural number.

The stages ST1, ST2, ST3, ST4, . . . may be formed from various types of shift registers. For example, each of the stages ST1, ST2, ST3, ST4, . . . may include a D-flip-flop type circuit that shifts and outputs a predetermined input signal.

In an embodiment, the left output signals LO1, LO2, LO3, LO4, . . . and the carry signals CR1, CR2, CR3, CR4, . . . are shifted by a predetermined amount according to a cycle of the main clock signal MCLK. In particular, pulse widths of the carry signals CR1, CR2, CR3, CR4, . . . shifted from the scan start signal STV may be determined by the cycle of the main clock signal MCLK.

FIG. 5A illustrates that one main clock signal MCLK is supplied to the stages ST1, ST2, ST3, ST4, . . . , but embodiments of the present invention are not limited thereto. For example, a first main clock signal may be supplied to the odd-numbered stages ST1 and ST3, and a second main clock signal in which the first main clock signal is shifted by a half cycle may be supplied to the even-numbered stages ST2 and ST4. The main clock signals may be supplied to control timings at which the carry signals CR1, CR2, CR3, CR4, . . . are output.

A first sub-clock signal SCLK1 may be supplied to the stages ST1, ST2, ST3, ST4, . . . of the first scan driver 200 including the first left scan driving circuit 210. The first sub-clock signal SCLK1 may determine a pulse width of each of the left output signals LO1, LO2, LO3, LO4, . . . . In addition, the first sub-clock signal SCLK1 may determine a time point at which each of the left output signals LO1, LO2, LO3, LO4, . . . transitions to a gate-off level and a time at which each of the left output signals LO1, LO2, LO3, and LO4, . . . transitions from a gate-on level to a predetermined voltage level (for example, a kickback compensation period). Accordingly, the left output signals LO1, LO2, LO3, LO4, . . . may have different waveforms from the carry signals CR1, CR2, CR3, CR4, . . . .

For example, each of the stages ST1, ST2, ST3, ST4, . . . may include a charge share circuit that controls charging of a capacitor in response to the first sub-clock signal SCLK1. The waveforms of the left output signals LO1, LO2, LO3, LO4, . . . may be determined by the operation of the charge share circuit.

Figure 5B:
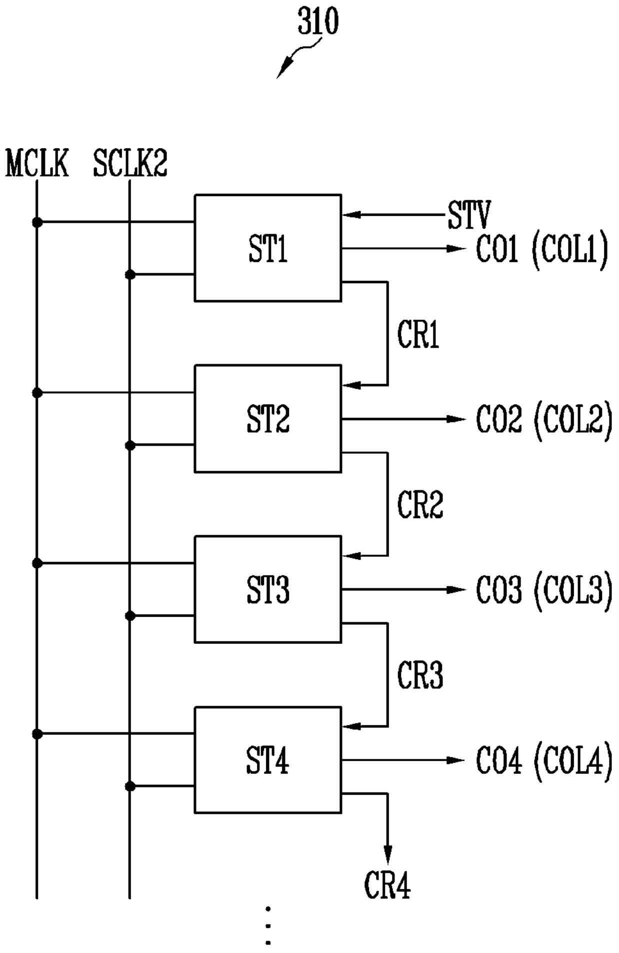
FIG. 5B is a block diagram illustrating an example of a second scan driver of FIG. 4.
Figure 5C:
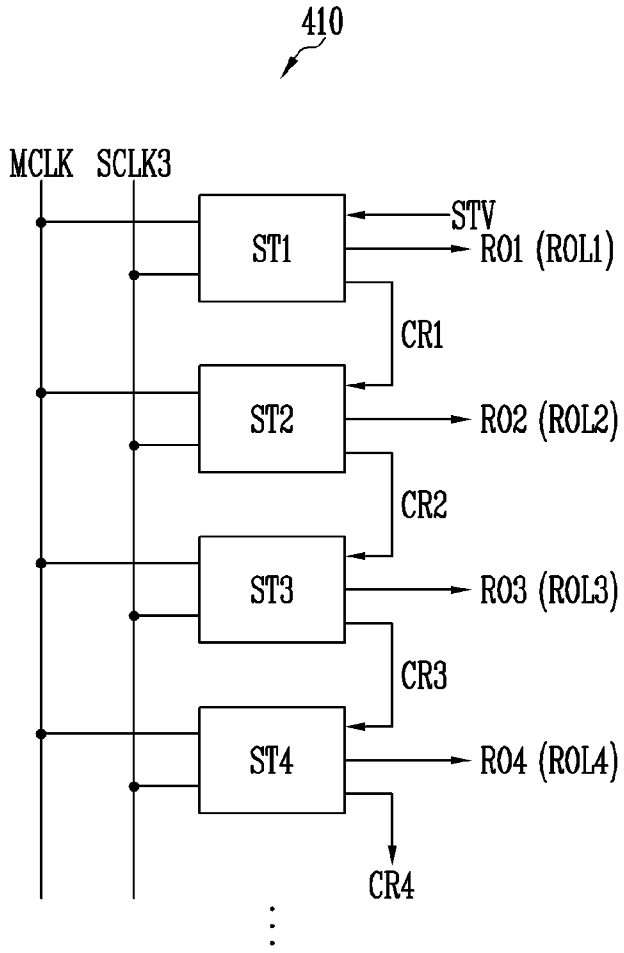
FIG. 5C is a block diagram illustrating an example of a third scan driver of FIG. 4.

FIG. 5B is a block diagram illustrating an example of the second scan driver of FIG. 4, and FIG. 5C is a block diagram illustrating an example of the third scan driver of FIG. 4.

In FIGS. 5B and 5C, the same reference numerals are used for the components described with reference to FIG. 5A, and redundant descriptions of the components will be omitted. In addition, the scan driving circuits of FIGS. 5A and 5C may have a configuration substantially the same as or similar to that of the first left scan driving circuit 210 of FIG. 5A except that different sub-clock signals are supplied.

Referring to FIGS. 1, 4, 5B, and 5C, each of a first center scan driving circuit 310 and a first right scan driving circuit 410 may include a plurality of stages ST1, ST2, ST3, ST4, . . . connected in a cascade structure.

Waveforms and output timings of carry signals CR1, CR2, CR3, CR4, . . . in first to third scan drivers 200, 300, 400 may be substantially the same.

First to fourth center output signals CO1, CO2, CO3, and CO4 may be sequentially supplied to first to fourth center signal lines COL1, COL2, COL3, and COL4, respectively. Each of the first to fourth center output signals CO1, CO2, CO3, and CO4 may be supplied to scan lines as a scan signal.

First to fourth right output signals RO1, RO2, RO3, and RO4 may be sequentially supplied to first to fourth right signal lines ROL1, ROL2, ROL3, and ROL4, respectively. Each of the first to fourth right output signals RO1, RO2, RO3, and RO4 may be supplied to scan lines as a scan signal.

The left output signals LO1, LO2, LO3, LO4, . . . , the center output signals CO1, CO2, CO3, CO4, . . . , and the right output signals RO1, RO2, RO3, RO4, . . . may have different waveforms due to a difference between the first sub-clock signal SCLK1, a second sub-clock signal SCLK2, and a third sub-clock signal SCLK3.

Figure 6:
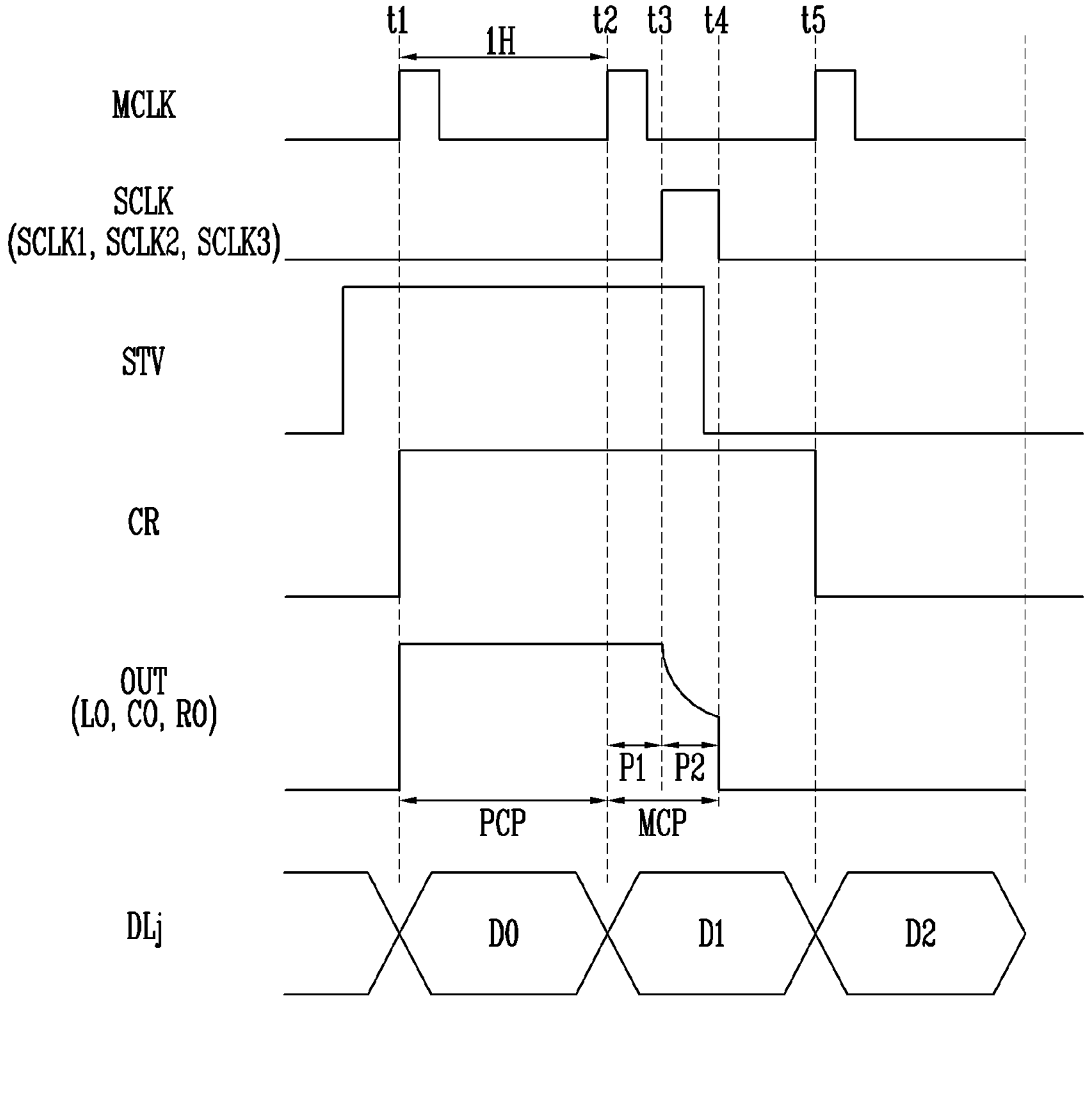
FIG. 6 is a timing diagram illustrating an example of an operation of the scan drivers of FIGS. 5A to 5C.

FIG. 6 is a timing diagram illustrating an example of an operation of the scan drivers of FIGS. 5A to 5C.

Referring to FIGS. 1, 3, and 6, a waveform of an output signal OUT may be determined in response to a sub-clock signal SCLK.

Stages of first to third scan drivers 200, 300, and 400 may output a carry signal CR and the output signal OUT in substantially the same manner. The sub-clock signal SCLK may be one of a first sub-clock signal SCLK1, a second sub-clock signal SCLK2, and a third sub-clock signal SCLK3, and the output signal OUT corresponding thereto may be one of a left output signal LO, a center output signal CO, and a right output signal RO.

In FIG. 6, descriptions will be given based on an operation of a first stage receiving a scan start signal STV. Accordingly, the output signal OUT may be supplied to a first scan line.

In addition, in FIG. 6, the driving of a stage will be described on the assumption that a high level of signals is a gate-on level and a low level thereof is a gate-off level. However, this is merely an example, and the low level may be set as the gate-on level.

In an embodiment, a main clock signal MCLK is supplied for a period of one horizontal period 1H. Data signals D0, D1, and D2 supplied to a $j^{th}$ data line DLj may be supplied at an interval of one horizontal period 1H. A first data signal D1 is applied to a pixel corresponding to the first scan line by the output signal OUT supplied to the first scan line.

After the scan start signal STV having a gate-on level is supplied, the carry signal CR and the output signal OUT transition to a gate-on level at a first time point t1 at which the main clock signal MCLK transitions to a gate-on level.

When the scan start signal STV transitions to a gate-off level (when the supply of the scan start signal STV is stopped), the carry signal CR transitions to a gate-off level at a fifth time point t5 at which the main clock signal MCLK transitions to a gate-on level. For example, a width of the carry signal CR may be determined as two horizontal periods 2H by an output timing of the scan start signal STV and the main clock signal MCLK. The carry signal CR may be supplied to a next stage.

In an embodiment, the stage may output the output signal OUT by cutting the generated carry signal CR using the sub-clock signal SCLK. The output signal OUT includes a pre-charge period PCP and a main-charge period MCP.

A period between the first time point t1 and a second time point t2, at which a previous data signal D0 is supplied, may be a pre-charge period PCP. That is, in the pre-charge period PCP, the previous data signal D0, which is not related to the first data signal D1 to be applied to the pixel, may be supplied. Since the pre-charge period PCP is provided, when the first data signal D1 is supplied, a scan signal (output signal OUT) may rise to a gate-on level. The first data signal D1 may be supplied from the second time point t2. For example, the first data signal D1 may start being supplied at the second time point t2.

The sub-clock signal SCLK transitions to a gate-on level at a third time point t3, and the sub-clock signal SCLK transitions to a gate-off level at a fourth time point t4. In an embodiment, a kickback compensation is applied to the output signal OUT in response to the sub-clock signal SCLK. For example, from the third time point t3 to the fourth time point t4, the output signal OUT is configured to fall at a predetermined slope. At the fourth time point t4, the output signal OUT transitions to a gate-off level in synchronization with a falling edge of the sub-clock signal SCLK.

In an embodiment, a period from the second time point t2 at which the first data signal D1 is supplied to the fourth time point t4 at which the supply of the output signal OUT is stopped (for example, the output signal OUT transitions to a gate-off level) is defined as the main-charge period MCP. The first data signal D1 corresponding to the pixel is applied to the pixel in the main-charge period MCP.

The main-charge period MCP includes a first period P1 and a second period P2. The first period P1 is a period in which the output signal OUT maintains a gate-on level, and the first data signal D1 is applied to the pixel.

The second period P2 is a kickback compensation period. That is, during the kickback compensation period, it is possible to prevent an abrupt change (falling) of the output signal OUT, and it is possible to prevent a voltage level of the first data signal D1 from unintentionally falling due to a kickback effect according to a change in the output signal OUT (and/or a scan signal).

In an embodiment, a pulse width of the output signal OUT, a length of the first period P1, and a length of the second period P2 is determined based on a pulse width of the sub-clock signal SCLK and an output timing of the sub-clock signal SCLK, which is a time point at which the sub-clock signal SCLK transitions to a gate-on level.

In an embodiment, a timing controller 600 adaptively adjusts the output timing and the pulse width of the sub-clock signal SCLK according to the positions of pixels PX in a display panel 100.

Figure 7:
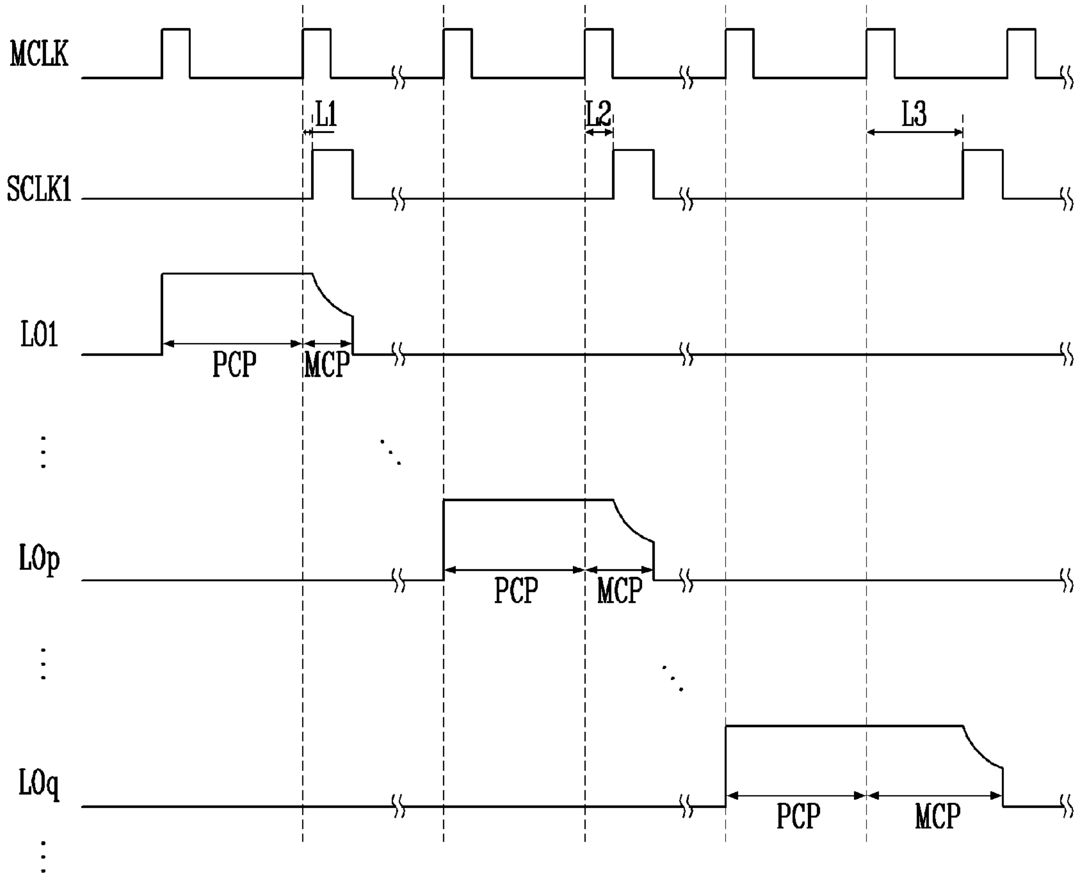
FIG. 7 is a timing diagram illustrating an example of an operation of the first scan driver of FIG. 5A.

FIG. 7 is a timing diagram illustrating an example of an operation of the first scan driver of FIG. 5A.

Referring to FIGS. 1, 2A, 6, and 7, a first scan driver 200 sequentially outputs left output signals LO1, . . . , LOp, . . . , and LOq to left signal lines LOL.

A first left output signal LO1 is supplied to a scan line disposed in a first area AA1. A $q^{th}$ left output signal LOq is supplied to a scan line disposed in a second area AA2. A $p^{th}$ output signal LOp is supplied to a scan line disposed between the first area AA1 and the second area AA2.

As described with reference to FIG. 2A, in a first pixel block BL1, an RC delay of a scan signal (left output signal) is the greatest in the first area AA1, and an RC delay of a scan signal gradually decreases toward a lower end of a display panel 100 (i.e., a direction opposite to a second direction DR2).

In an embodiment, a main-charge period MCP and a first period P1 are decreased to prevent or reduce data signal noise when the RC delay of the scan signal is increased. That is, as illustrated in FIG. 7, a pulse width and a main charge-period of the first left output signal LO1 is less than a pulse width and a main-charge period of the $p^{th}$ left output signal LOp. Similarly, a pulse width and a main-charge period of the $p^{th}$ left output signal LOp is less than a pulse width and a main-charge period of the qth left output signal LOq.

In an embodiment, pre-charge periods PCP all have the same width regardless of a position to which the output signals are supplied. For example, the pre-charge period PCP of each of the output signals LO1, LOp, and LOq are the same.

In an embodiment, the main-charge period MCP is determined in response to a first sub-clock signal SCLK1. A supply period of the first sub-clock signal SCLK1 may be adaptively adjusted as scanning is performed on scan lines. For example, a supply interval L1, L2, or L3 between a supply time point of the first sub-clock signal SCLK1 (i.e., a rising time) and a supply time point of a previous main clock signal MCLK may vary in response to an output signal. The supply intervals L1, L2, and L3 may correspond to the first period P1 included in the main-charge period MCP. In an embodiment, the first supply interval L1 is less than the second supply interval L2, and the second supply time interval L2 is less than the third supply time interval L3. In an embodiment, the length of a main-charge period MCP of a given left output signal increases in proportional to a length of the corresponding supply interval.

In an embodiment, a pulse width (i.e., a length of a gate-on period) of the first sub-clock signal SCLK1 is substantially uniform. In this embodiment, widths of second periods (i.e., kickback compensation periods) of the output signals LO1, . . . , LOp, . . . , and LOq are substantially uniform.

Figure 8:
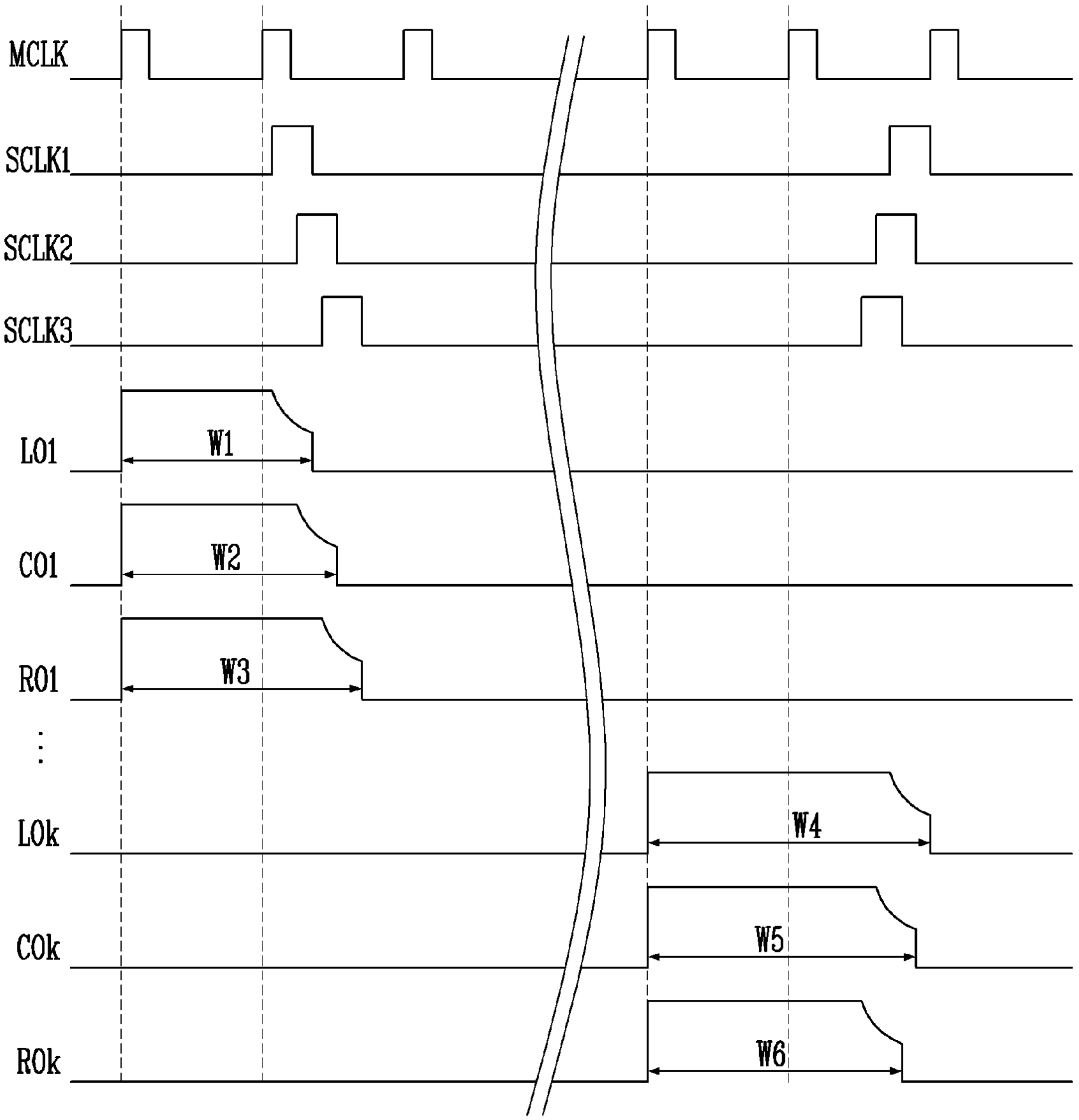
FIG. 8 is a timing diagram illustrating an example of an operation of the scan drivers of FIGS. 5A to 5C.

FIG. 8 is a timing diagram illustrating an example of an operation of the scan drivers of FIGS. 5A to 5C.

Referring to FIGS. 1, 2A, 7, and 8, changes in pulse widths of left output signals LO1 and LOk, changes in pulse widths of center output signals CO1 and COk, and changes in pulse widths of right output signals RO1 and ROk are different from one another.

A first left output signal LO1, a first center output signal CO1, and a first right output signal RO1 are substantially simultaneously or simultaneously supplied to the same scan line (for example, a first scan line) disposed in a first area AA1. A $k^{th}$ left output signal LOk, a $k^{th}$ center output signal COk, and a $k^{th}$ right output signal ROk are supplied substantially simultaneously or simultaneously to the same scan line (for example, a $k^{th}$ scan line) disposed in a second area AA2, wherein k is an integer greater than 1.

In an embodiment, the first left output signal LO1, the first center output signal CO1, and the first right output signal RO1 are output with different pulse widths (denoted by W1, W2, and W3) to compensate for an RC delay deviation between scan signals of first to third pixel blocks BL1, BL2, and BL3 in the first scan line. In an embodiment, a first width W1 of the first left output signal LO1 is less than a second width W2 of the first center output signal CO1, and the second width W2 is less than a third width W3 of the first right output signal RO1. That is, a pulse width (that is, the first width W1) of the first left output signal LO1, which corresponds to the first pixel block BL1 in which an RC delay is the greatest in the first area AA1, may be the smallest.

Similarly, in an embodiment, the kth left output signal LOk, the $k^{th}$ center output signal COk, and the $k^{th}$ right output signal ROk are output with different pulse widths (denoted by W4, W5, and W6) to compensate for an RC delay deviation between scan signals of the first to third pixel blocks BL1, BL2, and BL3 in the $k^{th}$ scan line. In an embodiment, a fourth width W4 is greater than a fifth width W5, and the fifth width W5 is greater than a sixth width W6. That is, a pulse width (that is, the sixth width W6) of the kth right output signal ROK, which corresponds to the third pixel block BL3 in which an RC delay is the greatest in the second area AA2, may be the smallest.

In an embodiment, the pulse widths of the left output signal, the center output signal, and the right output signal are all increased toward the lower end of the pixel unit 100 since a delay of a data signal is gradually decreased toward a lower end of a display panel 100. For example, the fourth width W4 may be greater than the first width W1, the fifth width W5 may be greater than the second width W2, and the sixth width W6 may be greater than the third width W3.

The pulse widths W1 and W4 of the left output signals LO1 and LOk and a length of a first period thereof may be determined by a first sub-clock signal SCLK1. The pulse widths W2 and W5 of the center output signals CO1 and COk and a length of a first period thereof may be determined by a second sub-clock signal SCLK2. The pulse widths W3 and W6 of the right output signals RO1 and ROk and a length of a first period thereof may be determined by a third sub-clock signal SCLK3.

In an embodiment, supply time points of the first to third sub-clock signals SCLK1, SCLK2, and SCLK3 respectively corresponding to the first left output signal LO1, the first center output signal CO1, and the first right output signal RO1 are different from one another. For example, the sub-clock signals may be output in the order of the first sub-clock signal SCLK1, the second sub-clock signal SCLK2, and the third sub-clock signal SCLK3 in response to scan signals supplied to the first scan line. For example, a first rising edge of the first sub-clock signal SCLK1 may occur before first rising edges of the second and third sub-clock signals SCLK2 and SCLK3, and a rising edge of the second sub-clock signal SCLK2 may occur before a rising edge of the third sub-clock signal SCLK3.

Similarly, supply time points of the first to third sub-clock signals SCLK1, SCLK2, and SCLK3 respectively corresponding to the $k^{th}$ left output signal LOk, the $k^{th}$ center output signal COk, and the $k^{th}$ right output signal ROk are different from one another. For example, the sub-clock signals may be output in the order of the third sub-clock signal SCLK3, the second sub-clock signal SCLK2, and the first sub-clock signal SCLK1 in response to scan signals supplied to the $k^{th}$ scan line. For example, a second rising edge of the third sub-clock signal SCLK3 may occur before second rising edges of the first and second sub-clock signals SCLK1 and SCLK2, and a second rising edge of the second sub-clock signal SCLK2 may occur before a second rising edge of the first sub-clock signal SCLK1.

In an embodiment, according to the structure of the display panel 100 described with reference to FIG. 2A, an RC delay deviation between scan signals is different for each area of each of the first pixel block BL1, the second pixel block BL2, and the third pixel block BL3. Accordingly, increased amounts of the pulse widths of the left output signal, the center output signal, and the right output signal may be different from one another within one frame period. For example, a change amount (pulse width difference) between the first width W1 and the fourth width W2 is greater than a change amount (pulse width difference) between the second width W2 and the fifth width W5. A change amount (pulse width difference) between the second width W2 and the fifth width W5 may be greater than a change amount between the third width W3 and the sixth width W6. However, a relationship of a change amount of a pulse width difference of the output signals is not limited thereto and may be differently determined by the structure of a display panel and a delay relationship between signals.

In an embodiment, the pulse widths of the left output signals LO1 and LOk, the center output signals CO1 and COk, and the right output signals RO1 and ROk are gradually increased in one frame period.

As described above, in the display device 1000 according to at least one embodiment of the present invention, a change amount of a pulse width of output signals is differently controlled for scan signals of each block BL1, BL2, or BL3 by considering a change in scan signal delay and a change in data signal delay for each pixel block and position of the display panel 100 due to a single side driving structure. Accordingly, it is possible to reduce a signal noise deviation and a charging ratio deviation of a data signal according to the position of a pixel PX caused by characteristics of a contact arrangement structure in a display panel of scan lines of a single side driving structure.

Figure 9:
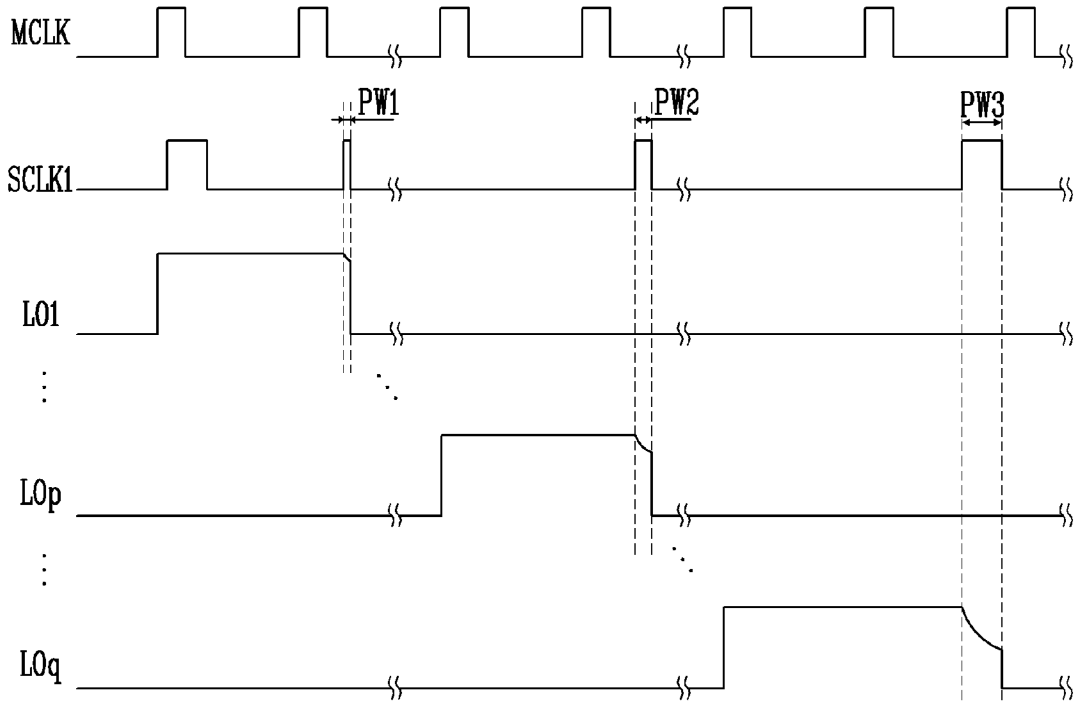
FIG. 9 is a timing diagram illustrating an example of an operation of the first scan driver of FIG. 5A.

FIG. 9 is a timing diagram illustrating an example of an operation of the first scan driver of FIG. 5A.

Referring to FIGS. 1, 2A, 7, and 9, a first scan driver 200 sequentially outputs left output signals LO1, . . . , LOp, . . . , and LOq to left signal lines LOL.

In an area in which an RC delay of a scan signal is small, a kickback problem of a data signal may occur. In a second area AA2 of a first pixel block BL1, since an RC delay of a scan signal is relatively smaller than that of a first area AA1, kickback compensation may be performed on a pixel corresponding to the second area AA2 for a relatively long time. For example, as a data signal is applied from the first area AA1 to the second area AA2, a kickback compensation period (for example, the second period P2 of FIG. 6) may be gradually increased.

That is, as described with reference to FIG. 7, as a data signal is applied from the first area AA1 to the second area AA2, a length of a second period P2 of a left output signal may be increase as a pulse width of the left output signal is increased.

In an embodiment, second periods of left output signals LO1, . . . , LOp, . . . , and LOq may be adjusted according to a pulse width of a first sub-clock signal SCLK1. For example, a second period P2 of a first left output signal LO1 may correspond to a first pulse width PW1 of the first sub-clock signal SCLK1. A second period P2 of a $p^{th}$ output signal LOp may correspond to a second pulse width PW2 of the first sub-clock signal SCLK1. A second period P2 of a $q^{th}$ left output signal LOq may correspond to a third pulse width PW3 of the first sub-clock signal SCLK1. In an embodiment, the first pulse width PW1 is less than the second pulse width PW2, and the second pulse width PW2 is less than the third pulse width PW3. That is, during one frame period, the pulse width of the first sub-clock signal SCLK1 may be gradually increased.

Accordingly, it is possible to reduce image quality degradation due to a kickback deviation for each area in the first pixel block BL1.

Figure 10:
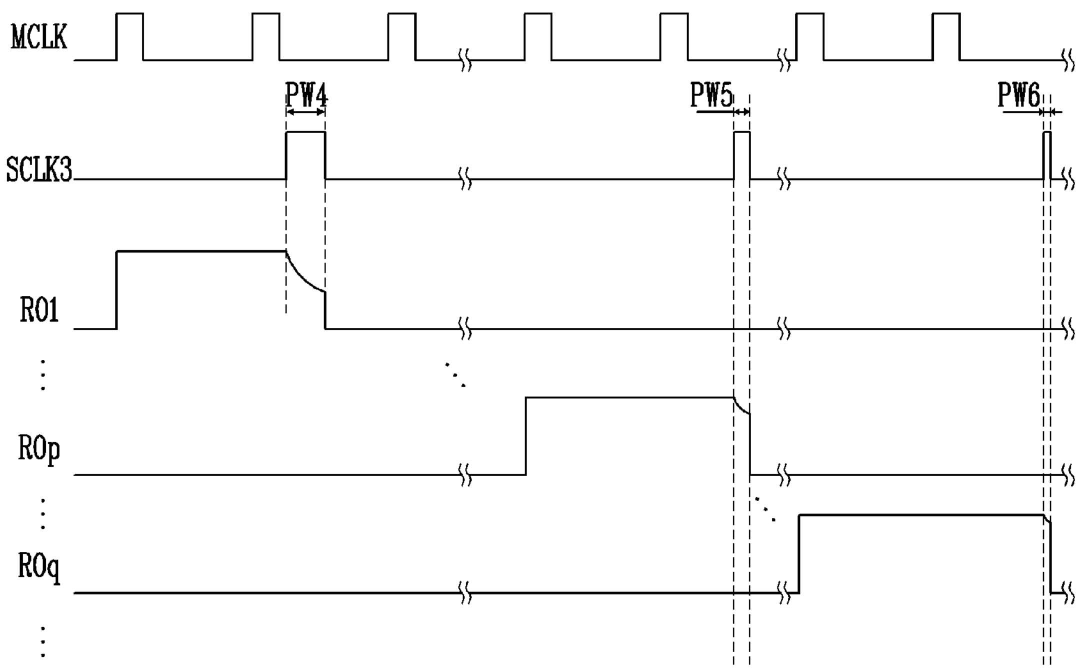
FIG. 10 is a timing diagram illustrating an example of an operation of the third scan driver of FIG. 5C.

FIG. 10 is a timing diagram illustrating an example of an operation of the third scan driver of FIG. 5C.

Referring to FIGS. 1, 2A, 7, and 10, a third scan driver 400 sequentially outputs right output signals RO1, . . . , ROp, . . . , and ROq to right signal lines.

Since an RC delay of a scan signal in a second area AA2 of a third pixel block BL3 is relatively greater than that of a first area AA1, as a data signal is applied from the first area AA1 to the second area AA2, a kickback compensation period (for example, the second period P2 of FIG. 6) may be gradually decreased. However, since a delay of a data signal is gradually decreased toward a lower end of a display panel 100, the total pulse width of the right output signal may be gradually increased toward the lower end of the display panel 100.

In an embodiment, a second period P2 of the right output signals RO1, . . . , ROp, . . . , and ROq may be adjusted according to a pulse width of a third sub-clock signal SCLK3. For example, a second period P2 of a first right output signal RO1 corresponds to a fourth pulse width PW4 of the third sub-clock signal SCLK3. A second period P2 of a $p^{th}$ right output signal ROp corresponds to a fifth pulse width PW5 of the third sub-clock signal SCLK3. A second period P2 of a $q^{th}$ right output signal ROq corresponds to a sixth pulse width PW6 of the third sub-clock signal SCLK3. In an embodiment, the fourth pulse width PW4 is greater than the fifth pulse width PW5, and the fifth pulse width PW5 is greater than the sixth pulse width PW6. That is, during one frame period, the pulse width of the third sub-clock signal SCLK3 may be gradually decreased.

Accordingly, as a data signal is applied from the first area AA1 to the second area AA2, the pulse width of the right output signal is increased, but the length of the second period P2 of the right output signal is decreased.

Accordingly, it is possible to reduce image quality degradation due to a kickback deviation for each area in the third pixel block BL3.

Figure 11:
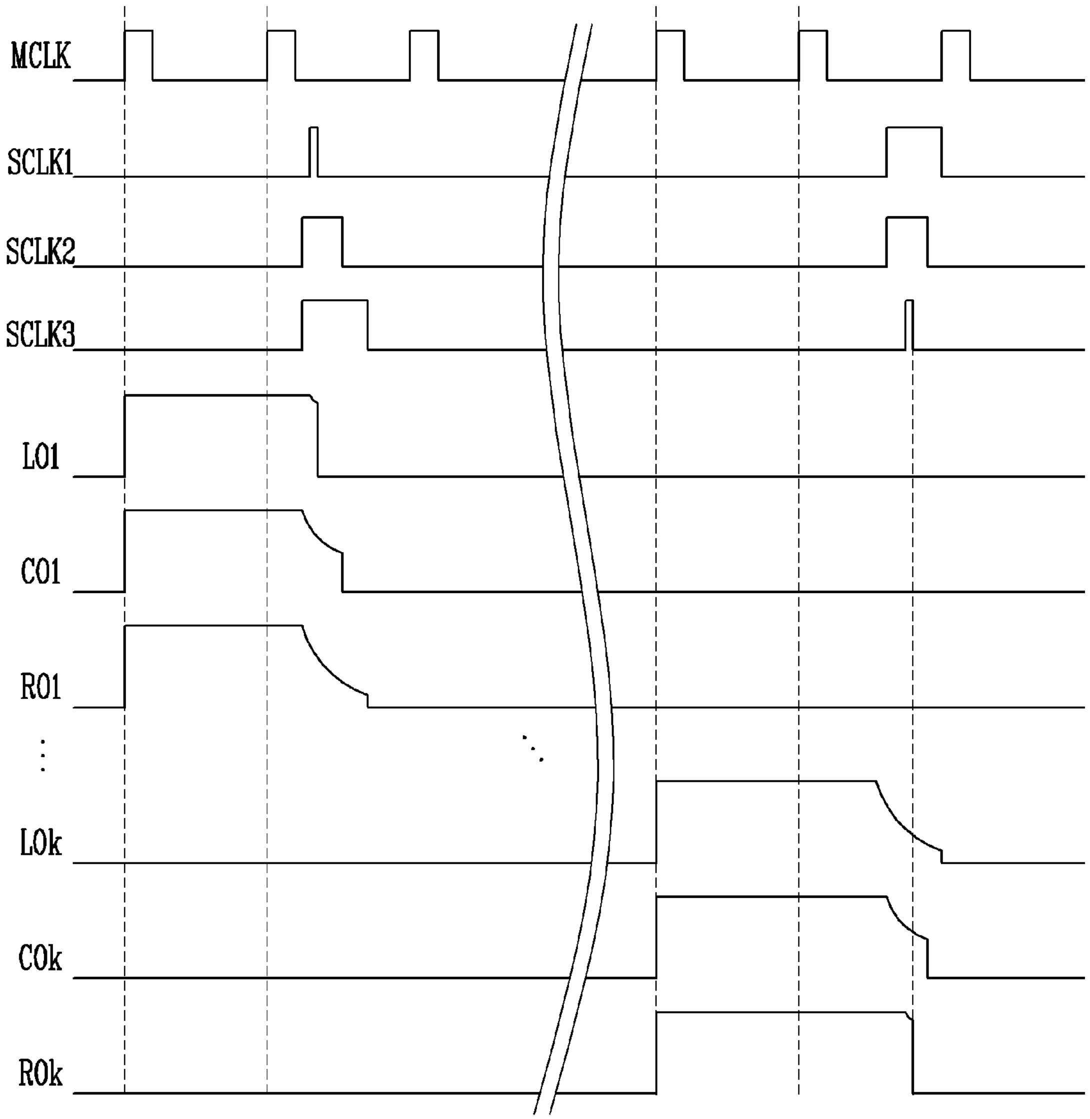
FIG. 11 is a timing diagram illustrating an example of an operation of the scan drivers of FIGS. 5A to 5C.

FIG. 11 is a timing diagram illustrating an example of an operation of the scan drivers of FIGS. 5A to 5C.

Referring to FIGS. 1, 2A, 9, 10, and 11, changes in pulse widths of left output signals LO1 and LOk, changes in pulse widths of center output signals CO1 and COk, and changes in pulse widths of right output signals RO1 and ROk are different from one another.

In an embodiment, a timing controller 600 gradually increases a pulse width of a first sub-clock signal SCLK1 and gradually decreases a pulse width of a third sub-clock signal SCLK3 during one frame period.

In an embodiment, the pulse width of the second sub-clock signal SCLK2, which corresponds to a second pixel block BL2 in which an RC delay of a scan signal is relatively uniform for each position, is uniform. For example, even though the pulse widths of the first sub-clock signal SCLK1 and the third sub-clock signal SCLK3 change during one frame period, the pulse width of the second sub-clock signal SCLK2 remains constant during the one frame period.

In other words, in addition to the output signals LO1, LOk, CO1, COk, RO1, and ROk described with reference to FIG. 8, a length of a second period (i.e., a kickback compensation period) for each position of a scan line may be adjusted. Therefore, in one frame period, in consideration of a kickback deviation for each position of a display panel 100, the left output signals LO1 and LOk and the right output signals RO1 and ROk may be controlled, thereby reducing data charging defects due to the kickback deviation. Accordingly, it is possible to increase image quality of a display device 1000 having a single side driving structure.

Figure 12:
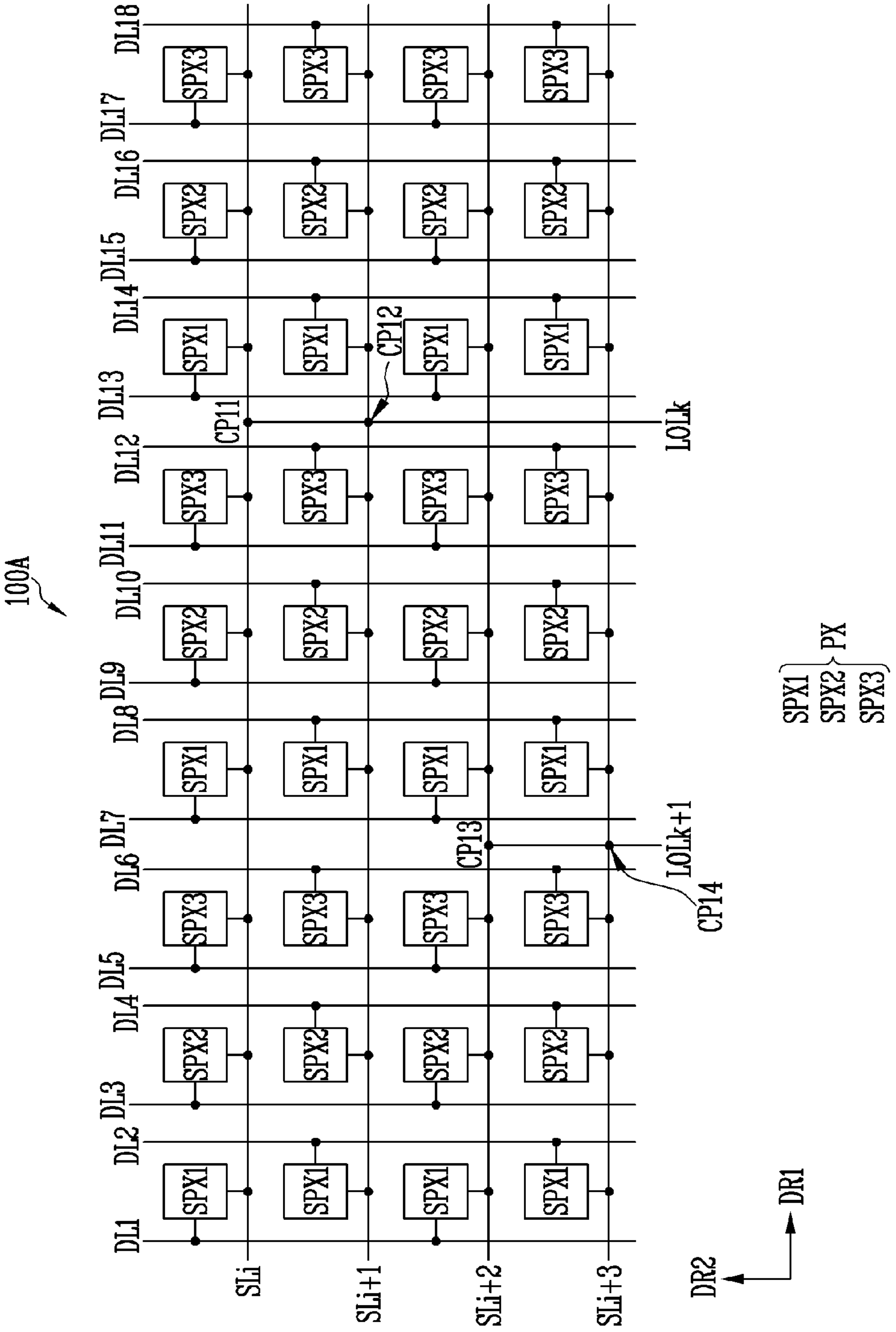
FIG. 12 is a block diagram illustrating an example of a pixel unit included in the display device of FIG. 1.

FIG. 12 is a block diagram illustrating an example of a display panel included in the display device of FIG. 1. For example, the display panel 100 of FIG. 1 may be implemented with the display panel 100*a* of FIG. 12.

Referring to FIGS. 1, 2A, and 12, subpixels SPX1, SPX2, and SPX3, data lines DL1 to DL18 and scan lines SLi to SLi+3 are present, wherein i is a natural number. FIG. 12 illustrates an example of a part of a first pixel block BL1 of a display panel 100A. Each of the subpixels is connected to one of the data lines and to one of the scan lines.

In an embodiment, a first subpixel SPX1, a second subpixel SPX2, and a third subpixel SPX3 emit light having different colors and may form one pixel PX. For example, the first subpixel SPX1, the second subpixel SPX2, and the third subpixel SPX3 may each emit one of red light, green light, and blue light.

In a single side driving structure, since scan drivers 200, 300, and 400 and a data driver 500 are disposed at the same side of the display panel 100A, data lines DL1 to DL18 and left signal lines LOLk and LOLk+1 may extend in the same direction (for example, a second direction DR2), wherein k is a natural number.

In an embodiment, a $k^{th}$ left signal line LOLk is commonly connected to an $i^{th}$ scan line SLi and an $i+1^{th}$ scan line SLi+1. For example, the $k^{th}$ left signal line LOLk may be connected to the $i^{th}$ scan line SLi through a first contact CP11 and may be connect to the $i+1^{th}$ scan line SLi+1 through a second contact CP12. Accordingly, scan signals may be simultaneously supplied to the $i^{th}$ scan line SLi and the $i+1^{th}$ scan line SLi+1.

Due to the high resolution and high speed driving of a display device 1000, a period for applying data to the pixel PX may be decreased. That is, one horizontal period for driving one pixel row may be decreased. Accordingly, as illustrated in FIG. 4A, one left signal line may be connected to a plurality of scan lines such that scan signals are simultaneously supplied to a plurality of pixel rows (the same applies to a center signal line and a right signal line).

In an embodiment, the data lines DL1 to DL18 are not connected to subpixels of adjacent pixel rows, thereby avoiding a collision of data signal writing due to the same scan signal being supplied to a plurality of pixel rows. For example, a first data line DL1 may be connected to the first subpixels SPX1 of even-numbered pixel rows of a first pixel column, and a second data line DL2 may be connected to the first subpixels SPX1 of odd-numbered pixel rows of the first pixel column. A third data line DL3 may be connected to the second subpixels SPX2 of even-numbered pixel rows of a second pixel column, and a fourth data line DL4 may be connected to the second subpixel SPX2 of odd-numbered pixel rows of the second pixel column. A fifth data line DL5 may be connected to the third subpixels SPX3 of even-numbered pixel rows of a third pixel column, and a sixth data line DL6 may be connected to the third subpixel SPX3 of odd-numbered pixel rows of the third pixel column.

In this embodiment, data signals corresponding to an $i^{th}$ pixel row and an $i+1^{th}$ pixel row may be simultaneously supplied to first to eighteenth data lines DL1 to DL18. However, this is merely an example, as data signals corresponding to the ith pixel row may be supplied in a partial period of a period in which scan signals are supplied to $i^{th}$ and $i+1^{th}$ scan lines SLi and SLi+1, and data signals corresponding to the $i+1^{th}$ pixel row may be supplied in another partial period of the period in which scan signals are supplied.

Similarly, a $k+1^{th}$ left signal line LOLk+1 may be commonly connected to an $i+2^{th}$ scan line SLi+2 and an $i+3^{th}$ scan line SLi+3. For example, the $k+1^{th}$ left signal line LOLK+1 may be connected to the $i+2^{th}$ scan line SLi+2 through a third contact CP13, and the $i+3^{th}$ signal line may be connected to the $i+3^{th}$ scan line SLi+3 through a fourth contact CP14. Accordingly, scan signals may be simultaneously supplied to the $i+2^{th}$ scan line SLi+2 and the $i+3^{th}$ scan line SLi+3.

In an embodiment, as illustrated in FIG. 4A, one pixel PX may be positioned between the $k^{th}$ left signal line LOLk and the $k+1^{th}$ left signal line LOLk. In such a trend, contacts (the first contact group CG1 of FIG. 2A) and the left signal lines LOL may be disposed at predetermined intervals. Similarly, center signal lines COL and right signal lines ROL may be disposed in a second pixel block BL2 and a third pixel block BL3, respectively.

Please note that above, whenever the term center is used such a center point or center signal line, the point or the signal line need not be exactly in the middle of the display panel 100, and instead can refer to a middle point or middle signal line that is located in between a first or left point or signal line and a second or right point or signal line.

As described above, in the display device according to at least one embodiment of the present disclosure, it is possible to compensate for an RC delay deviation of a scan signal according to the arrangement of contacts in a display panel due to a single side driving structure. In particular, change amounts of pulse widths within one frame period of output signals (left output signal (or, first output signal), center output signal (or, second output signal), and right output signal (or, third output signal)) for a scan signal may be independently controlled to be different for each pixel block. Accordingly, it is possible to reduce a signal noise deviation and a charging ratio deviation of a data signal according to the positions of pixels caused by characteristics of a contact arrangement structure of scan lines in the display panel of a single side driving structure.

In addition, in the display device according to at least one embodiment of the present disclosure, second periods (kickback compensation periods) of left output signals and right output signals may be adaptively controlled within one frame period by additionally considering a kickback deviation for each pixel position caused by characteristics of the contact arrangement structure of the scan lines in the display panel of the single side driving structure. Accordingly, data charging problems due to a kickback deviation may be reduced. Accordingly, it is possible to increase image quality of the display device having the single side driving structure.

Although the present invention has been described with reference to various embodiments, those of ordinary skill in the art will appreciate that various modifications and variations can be made in the present invention without departing from the spirit or scope of the invention.

What is claimed is:

1. A display device comprising:
- a display panel comprising pixel blocks including a plurality of pixels;
- scan lines connected to the plurality of pixels of the pixel blocks;
- signal line groups each including signal lines,
- wherein signal lines of a first signal line group of the signal line groups are connected respectively to the scan lines at first contacts in a first pixel block of the pixel blocks and signal lines of a second signal line group of the signal line groups are connected respectively to the scan lines at second contacts in a second pixel block of the pixel blocks; and
- a scan driver to supply a first output signal as a scan signal to the signal lines of the first signal line group and to supply a second output signal as the scan signal to the signal lines of the second signal line group,
- wherein the first output signal and the second output signal have pulse widths different from each other in one frame period,
- wherein the pixel blocks are sequentially arranged in a first direction, and
- wherein the scan lines extend in the first direction and arranged in a second direction intersecting the first direction.

2. The display device of claim 1, wherein:
- a first one of the first contacts is closer to the second pixel block than a second one of the first contacts;
- the first one of the first contacts has a first distance from the scan driver; and
- the second one of the first contacts has a second distance from the scan driver, the second distance being less than the first distance.

3. The display device of claim 1, wherein:
a first one of the second contacts is closer to the first pixel block than a second one of the second contacts;
the first one of the second contacts has a third distance from the scan driver; and
the second one of the second contacts has a fourth distance from the scan driver, the fourth distance being greater than the third distance.

4. The display device of claim 1, wherein:
the scan driver is disposed adjacent to the display panel in the second direction.

5. The display device of claim 1, wherein the signal lines of the first signal line group and the second signal line group extend in the second direction.

6. The display device of claim 1, wherein:
signal lines of a third signal line group of the signal line groups are connected respectively to the scan lines at third contacts in a third pixel block of the pixel blocks; and
the scan driver is configured to supply a third output signal as the scan signal to the signal lines of the third signal line group.

7. The display device of claim 6, wherein:
the first to third pixel blocks are sequentially arranged in a first direction; the scan lines extend in the first direction; and
the signal lines of the first to third signal line groups extend in a second direction intersecting the first direction.

8. The display device of claim 7, wherein lengths of the signal lines of each of the first to third signal line groups gradually increase toward the first direction.

9. The display device of claim 8, wherein the display panel is divided into a first area and a second area closer to the scan driver than the first area, and two or more different scan lines among the scan lines are disposed in the first area and the second area, respectively.

10. The display device of claim 9, wherein the pulse width of the first output signal, the pulse width of the second output signal, and the pulse width of the third output signal increase at different rates during the one frame period.

11. The display device of claim 1, further comprising a timing controller to generate a first sub-clock signal and a second sub-clock signal, wherein the scan driver is configured to supply the first output signal based on the first sub-clock signal and to supply the second output signal based on the second sub-clock signal.

12. The display device of claim 11, wherein the timing controller is configured to adjust at least one of a supply time point and a pulse width of each of the first and second sub-clock signals to adjust the pulse widths of the first and second output signals.

13. The display device of claim 1, further comprising a data driver to supply data signals to the pixels through data lines, wherein the data driver is disposed at the same side as the scan driver from the display panel.

14. A display device of comprising:
a display panel comprising pixel blocks including a plurality of pixels;
scan lines connected to the plurality of pixels of the pixel blocks;
signal line groups each including signal lines,
wherein signal lines of a first signal line group of the signal line groups are connected respectively to the scan lines at first contacts in a first pixel block of the pixel blocks and signal lines of a second signal line group of the signal line groups are connected respectively to the scan lines at second contacts in a second pixel block of the pixel blocks; and
a scan driver to supply a first output signal as a scan signal to the signal lines of the first signal line group and to supply a second output signal as the scan signal to the signal lines of the second signal line group,
wherein the first output signal and the second output signal have pulse widths different from each other in one frame period,
wherein a distance from each of the first contacts to the scan driver increases as a distance from a corresponding first contact to the second pixel block decreases.

15. A display device of comprising:
a display panel comprising pixel blocks including a plurality of pixels;
scan lines connected to the plurality of pixels of the pixel blocks;
signal line groups each including signal lines,
wherein signal lines of a first signal line group of the signal line groups are connected respectively to the scan lines at first contacts in a first pixel block of the pixel blocks and signal lines of a second signal line group of the signal line groups are connected respectively to the scan lines at second contacts in a second pixel block of the pixel blocks; and
a scan driver to supply a first output signal as a scan signal to the signal lines of the first signal line group and to supply a second output signal as the scan signal to the signal lines of the second signal line group,
wherein the first output signal and the second output signal have pulse widths different from each other in one frame period,
wherein a distance from each of the second contacts to the scan driver decreases as a distance from a corresponding second contact to the first pixel block decreases.

* * * * *